(12) United States Patent
Tremblay

(10) Patent No.: US 7,216,849 B2
(45) Date of Patent: May 15, 2007

(54) WINCH, VEHICLE INCLUDING THE SAME AND METHOD OF OPERATING ASSOCIATED THERETO

(75) Inventor: Raynald Tremblay, Jonquière (CA)

(73) Assignee: Groupe 2T2 Inc., Montreal (Quebec) (CA)

( * ) Notice: Subject to any disclaimer, the term of this patent is extended or adjusted under 35 U.S.C. 154(b) by 98 days.

(21) Appl. No.: 10/542,734

(22) PCT Filed: Jan. 27, 2004

(86) PCT No.: PCT/CA2004/000109

§ 371 (c)(1),
(2), (4) Date: Aug. 3, 2005

(87) PCT Pub. No.: WO2004/067318

PCT Pub. Date: Aug. 12, 2004

(65) Prior Publication Data

US 2006/0180800 A1    Aug. 17, 2006

Related U.S. Application Data

(60) Provisional application No. 60/442,559, filed on Jan. 27, 2003, provisional application No. 60/482,724, filed on Jun. 27, 2003.

(30) Foreign Application Priority Data

Jan. 27, 2003  (CA) ................................. 2417715
Jun. 27, 2003  (CA) ................................. 2433752

(51) Int. Cl.
*B21F 9/00*    (2006.01)
(52) U.S. Cl. ................. 254/220; 254/229; 254/343; 410/103; 24/70 ST; 24/69 ST

(58) Field of Classification Search ............... 254/220, 254/221, 222, 229, 241, 250, 343; 410/103; 24/70 ST, 69 ST, 69 CT, 69 TM
See application file for complete search history.

(56) References Cited

U.S. PATENT DOCUMENTS 919,093 A * 4/1909 Vail ........................... 254/220

(Continued)

FOREIGN PATENT DOCUMENTS

CA         2230620         1/1999

(Continued)

*Primary Examiner*—Emmanuel M Marcelo
(74) *Attorney, Agent, or Firm*—Arent Fox LLP

(57) ABSTRACT

A winch (1), a vehicle including the same and a method of operating associated thereto. The winch (1) is used with a strap (15) for fastening a load onto a transportation vehicle, and comprises a tightening assembly (3) and a gear assembly (5). The tightening assembly (3) comprises a support structure having first and second support flanges (7, 9) and a cross member (11) extending between the flanges (7, 9). The cross member (11) is devised for mounting onto a corresponding side track of the vehicle. The tightening assembly (3) also comprises a tightening reel (13) for receiving a portion of the strap (15) to be tightened about said reel (13), the tightening reel (13) being pivotally mounted onto the first and second support flanges (7,9). The gear assembly (5) is operatively connected to the tightening assembly (3), and comprises a gear (17), a worm (19), and a casing (21). The gear (17) is securely mounted about the tightening reel (13) so as to rotate with said reel (13). The worm (19) is positioned adjacent to the gear the worm (17) is threadedly engaged with the gear (19) so that a rotation of the worm (17) drives the tightening reel (13) via the gear (17), along opposite directions of rotation, for either fastening or unfastening the strap (15) onto the tightening reel (13). Excess portion of the strap 15 may be wound about a winding assembly (27) which is removably mountable onto the tightening assembly (3).

19 Claims, 14 Drawing Sheets

U.S. PATENT DOCUMENTS

| | | | |
|---|---|---|---|
| 2,521,191 A * | 9/1950 | Stanland | 254/343 |
| 2,678,191 A * | 5/1954 | Jensen | 254/330 |
| 3,240,473 A | 3/1966 | Coffey et al. | |
| 3,618,898 A * | 11/1971 | Notestine | 254/343 |
| 3,697,049 A * | 10/1972 | Wallace | 254/343 |
| 4,613,273 A * | 9/1986 | Wagner | 414/463 |
| 4,823,443 A | 4/1989 | Waters | |
| 5,005,777 A * | 4/1991 | Fernandez | 242/390.2 |
| 5,156,506 A | 10/1992 | Bailey | |
| 5,295,664 A | 3/1994 | Kamper | |
| 5,346,153 A | 9/1994 | Ebey | |
| 5,388,480 A * | 2/1995 | Townsend | 74/501.5 R |
| 5,466,030 A | 11/1995 | Harris et al. | |
| 5,853,164 A | 12/1998 | Hunt | |
| 6,102,637 A | 8/2000 | Mocci | |

FOREIGN PATENT DOCUMENTS

| | | |
|---|---|---|
| CA | 2 354 934 | 2/2003 |
| DE | 4226083 | 2/1994 |
| DE | 100 50 000 A1 | 1/2002 |
| WO | WO 99/17704 | 4/1999 |
| WO | WO 03/013906 A1 | 2/2003 |

* cited by examiner

PERSPECTIVE VIEW

FRONT VIEW

SIDE VIEW

WINCH, VEHICLE INCLUDING THE SAME AND METHOD OF OPERATING ASSOCIATED THERETO

This application is a 371 of PCT/CA2004/000109, filed Jan. 27, 2004, which claims priority to Canadian Patent Application No. 2,417,715, filed Jan. 27, 2003; U.S. Provisional Patent Application No. 60/442,559, filed Jan. 27, 2003; Canadian Patent Application No. 2,433,752 filed Jun. 27, 2003; and U.S. Provisional Patent Application No. 60/482,724 filed Jun. 27, 2003. The entire contents of each of the above applications is herein incorporated by reference.

FIELD OF THE INVENTION

The present invention relates to a winch, to a vehicle including the same, and to a method of operating associated thereto, namely to a method of securing cargo on a vehicle with the winch and a corresponding fastening strap. The winch is particularly useful for various types of transportation vehicles, such as flatbed trucks, railcars, and the like.

BACKGROUND OF THE INVENTION

It is known in the art that a trailer with platform is a road transportation vehicle which comprises a loading tray. There are various types of loads which may be transported on such a vehicle with platform and these generally consist of heavy objects, objects disposed on pallets, and/or other types of objects whose handling requires the use of hauling mechanisms, such as hoists, which typically have access to the load either by the side(s) of the vehicle or by the top thereof.

It is also known in the art that these types of transportation vehicles are generally equipped with transversal securement devices which are typically arranged along the longitudinal axis of the loading tray, onto corresponding side rails or tracks. The users of these vehicles must conform to the requirements of security standards, in regards to the use of securement devices of adequate capacity, the required number thereof being established according to the payload being transported and to the length of the load to be secured.

Typical securement devices are tie down winches which are very well known in the art. Indeed, these types of winches are generally installed on a trailer, and more particularly are inserted onto rails present on each side of the trailer, and positioned at desired locations. They are used for tightening the fastening belts, also known as straps, etc., as well as the chains and other fastening accessories used to secure different loads carried by the trailer.

Known in the art are several types of rails. On most trailers, winches are inserted onto the rails by means of corresponding grooves provided on the winches. On other trailers, winches are inserted on the rails by means of an optional plate which is typically welded on the top of the winch. On yet other trailers, other suitable mounting means may be used.

A conventional tie down winch generally comprises a slit for receiving an end of a fastening strap, a reel for winding the strap about the same, and a hole or opening for receiving a winding bar so as to be able to wind and tighten the strap about the reel. The installation of belts on conventional winches is generally carried out as follows. Firstly, the belt is inserted through the slit or opening(s) of the winch reel. This step is done only at the first installation of the belt on the winch. Secondly, the belt is then rolled-up onto the winch reel. The winding-up of the belt is generally done manually. The belt is then passed over the load and fixed to the other side of the trailer by means of its hook, and tightened in place about the reel with a winding bar. The conventional tie down winch is typically provided with a ratchet safety mechanism for maintaining a certain tightening of the strap and for preventing unwinding thereof.

A problem associated with this type of tie down winch and method of tightening is that it is impossible to tighten rather securely the winch in position when it is not used. Indeed, this is explained by the fact that during the tightening, the winch moves in the same direction as the force applied which in turn provokes a premature wear of the trailer rails caused by the vibrations which result when the vehicle circulates.

It is also known in the art that the operation of a conventional winch and corresponding belt is typically carried out by means of a winding bar which is generally inserted into a corresponding hole on the right-hand side of the winch. The belt may be loosened by pushing the bar downwards. However, the latch must be raised to allow the reel to turn freely. As can be appreciated, this step is difficult because the use of both hands by an operator is required to manipulate and the bar and the latch at the same time. The belt is then unwound in the desired length simply by pulling it. The belt is then pulled over a load to be fastened, to the opposite side of the trailer. The belt is then fixed to the trailer support (or rail) on the opposite side of the trailer by means of its hook.

The excess of the belt is then rolled-up and aligned manually on the winch reel, as aforementioned. The bar is then inserted into the hole or opening on the right-hand side of the winch. The belt is then tightened by pushing and pulling the bar downwards. It has been found in the art that this method of tightening requires a significant amount of force by the user on the bar and thus has been found to cause wounds, namely stresses and strains on different body parts of an operator of such typical tie down winches. Furthermore, since the tightening force transmitted to the fastening belt is directly proportional to the force applied by the operator with the bar, it has been found that the physical requirements and resulting fatigue of an operator generally have adverse consequences on the tightening tension applied to the different fastening belts (they are not uniform, not constant, etc.).

Furthermore, it has also been found that since the belt is rolled-up on itself several times, there will be a loss of tension in the belt due to the yielding of the wound portion of the belt and as a result thereof, it is necessary that the transportation vehicle be stopped periodically and that the load be retightened several times during the transportation of the cargo.

Also known in the art are other types of securement devices which are typically known as chain benders. A typical chain bender generally comprises a bender and a tightening bar. These chain benders and corresponding chains are often stored at the back of the vehicle when they are not used. Similarly to the fastening straps, a chain is generally pulled over the load and fixed to the trailer support (or rail) on the opposite side of the trailer by means of its hook.

It is known in the art that the bender is then fixed to a link of the chain and to the support of the trailer by means of its hooks. The hook of the chain bender must be moved on the link that will allow a tightening. The tightening bar is then inserted on the handle of the chain bender, and tightening of the chain is carried out with the tightening bar.

It has been found in the art that what often happens is that the link used does not allow an adequate tightening of the chain. As a result thereof, a proper tightening is very difficult to obtain. Moreover, the handle of the chain bender is often reassured by means of an elastic belt provided with hooks, in order to impede the bender from opening itself and from having to retighten it (loss of time).

Known to the Applicant are the following patents and patent applications which describe different winches, as well as the various accessories used therewith: CA 2,230,620; CA 2,354,934; U.S. Pat. No. 4,823,443; U.S. Pat. No. 5,156,506; U.S. Pat. No. 5,295,664; U.S. Pat. No. 5,346,53; U.S. Pat. No. 5,466,030; U.S. Pat. No. 5,853,164; U.S. Pat. No. 6,102,637; and DE 42 26 083 A1.

Also known in the art are the various disadvantages associated with the above-described types of conventional winches. Indeed, in regards to the tightening of straps/chains, the conventional winch uses a principle of lever so as to enable to tightening the straps/chains. Indeed, a bar (typically three feet in length) must be inserted into a corresponding hole in the reel of the winch and pushed downwards to tighten the fastening straps by means of substantial physical requirement to the operator of the winch. The substantial disadvantages of such tightening method is that it is very demanding physically and can cause serious harms and/or injuries to an operator. Furthermore, due to the poor design and components of such typical tie down winch and corresponding straps, the tightening is often uneven on all the different winches of a trailer because the level of fatigue of the operator increases from the tightening of a first winch to the tightening of a subsequent winch. Indeed, it has been found that there are substantial tightening tension discrepancies between the first winch tightened by the operator and the last winch tightened by the operator which in turn causes tightening unbalances along the cargo supported by the vehicle, which is very undesirable for stability reasons, as can be easily understood.

Another substantial disadvantage associated with conventional winches is that the tightening force thereof is not constant and not uniform. As aforementioned, very often there is not enough tightening force present in the fastening straps, and/or there are differences in the tightening forces from one strap to another, and this increases the risk of slipping and shifting of the load during transportation, which is very undesirable.

Another disadvantage associated with conventional winches is that the tension applied to the belt is maintained by means of a latch fixed to the frame of the winch, which blocks the reel. In the advent of a reversal of the trailer, the pressure will thus be distributed by the latch onto the frame of the winch, and in turn this will tend to deform the winch under the impact and release the load, which is very undesirable for obvious reasons known in the art.

Another problem associated with conventional winches is that the belt is squeezed on itself around the reel of the winch during the tightening process which is undesirable because the belt presses on itself during the tightening, thereby resulting in a loss of tightening tension. Moreover, as a result thereof, the tightening is uneven on all the different winches of the trailer which in turn provokes a deformation and a premature wear of the trailer. Moreover, as a result of the aforementioned, there is a loss of tension in the belts due to the vibrations during the transportation which in turn obliges the operator to frequently stop the vehicle and retighten the belt several times during a given trip. Moreover, there is a premature wear of the belt resulting when the tightening in the presence of sand, dust and/or other debris between the windings of the belt.

Another problem associated with conventional winches is that the belt must be manually rolled-up on all its length about the reel of the winch before being tightening in place with the winding bar. This is undesirable because it is a long procedure and very time-consuming; does not allow to fix solidly the winch to the rails of the trailer because the winch moves in the same direction as the tightening force; and causes wear of the trailer rails to which winches are fixed due to the vibrations of the winches when the vehicle circulates. Indeed, in certain cases, rails must be replaced on a yearly basis, which is very costly.

Another problem associated with conventional winches is that the operator must raise the latch to unblock the reel at the same time as he/she is attempting to loosen the belt by means of the winding bar. This is very undesirable because it is difficult to operate the winch since the operator must use both hands to operate both the latch and the winding bar at the same time.

Another problem associated with conventional winches and with the chain benders used therewith is that once again, the principle of lever is required to tighten the chains, which in turn results in the same disadvantages associated with conventional winches and their straps. Indeed, this is very undesirable in that the method is very demanding physically and can cause serious harms and/or injuries to the operator of the winch. Moreover, an operator is often required to go over the load in order to operate the chain benders, which may in turn result in falls from the load and serious injuries to the operator. Furthermore, the load is often unsufficiently or excessively tightened because the step of tightening is based on the length of a given chain link, which in turn causes an improper tightening and damages to the equipment.

Hence, in light of the aforementioned, there is a need for an improved winch which, by virtue of its design and components, would be able to overcome some of the aforementioned prior art problems.

SUMMARY OF THE INVENTION

The object of the present invention is to provide a winch which satisfies some of the above-mentioned needs and which is thus an improvement over other related winches known in the prior art.

In accordance with the present invention, the above object is achieved, as will be easily understood, with a winch for use with a strap for fastening a load onto a transportation vehicle, the winch comprising:

a tightening assembly, the tightening assembly comprising:
  a support structure having first and second support flanges and a cross member extending between the support flanges, the cross member being devised for mounting onto a corresponding side track of the vehicle; and
  a tightening reel for receiving a portion of the strap to be tightened about said reel, the tightening reel being pivotally mounted onto the first and second support flanges;
a gear assembly operatively connected to the tightening assembly, the gear assembly comprising:
  a gear securely mounted about the tightening reel so as to rotate with said reel;

a worm positioned adjacent to the gear and operable between a first configuration where the worm is away from the gear, and a second configuration where the worm is threadedly engaged with the gear so that a rotation of the worm drives the tightening reel via the gear; and a casing mounted onto the first support flange of the support structure and having corresponding recesses for containing the gear and worm respectively.

Preferably, the winch comprises a winding assembly removably mountable onto the tightening assembly, the winding assembly comprising:

a support structure having first and second extensions and a cross member extending between the extensions, the ends of the extensions being removably mountable onto the tightening assembly; and a winding reel for receiving an excess portion of the strap to be wound about the same, the winding reel being pivotally mounted onto the first and second extensions.

Preferably also, the ends of the extensions of the winding assembly are removably mountable onto the tightening reel of the tightening assembly, and wherein the winding assembly is pivotably movable with respect to said tightening assembly, the winch further comprising adjustment means 37 for selectively adjusting the positioning of the winding assembly with respect to the tightening assembly.

Preferably also, the tightening assembly comprises a clamping lamella removably mounted onto the tightening reel, the clamping lamella being provided with at least one leg mounted into the tightening reel and being movable thereabout, the clamping lamella being operable between a first configuration where it is positioned away from the tightening reel so as to enable a portion of the strap to be brought onto and removed from the tightening reel, and a second configuration where the clamping lamella is positioned with respect to the tightening reel so as to define a slit between the lamella and the tightening reel for receiving a segment of the strap thereinbetween, and where further rotation of the tightening reel, and further rotation of the strap about the clamping lamella, biases the clamping lamella towards the tightening reel for clamping the strap segment against the tightening reel.

According to another aspect of the invention, there is also a transportation vehicle provided with a winch such as the one briefly described herein and such as the one exemplified in the accompanying drawings.

According to yet another aspect of the invention, there is also provided a method of fastening a load with a strap onto the above-mentioned transportation vehicle, the method comprising the steps of:

a) providing the transportation vehicle;
b) mounting the winch onto a corresponding side track of the transportation vehicle;
c) attaching a first extremity of the strap onto an anchoring point;
d) clamping a portion of the strap about the tightening reel;
e) rotating the tightening reel so as to tighten the strap.

Preferably, step e) comprises the step of: f) operating the worm in its second configuration so as rotate the tightening reel via the gear. Preferably also, the method comprises the steps of: g) mounting a winding assembly onto the tightening assembly of the winch; and h) winding an excess portion of the strap onto the winding reel of the winding assembly.

The objects, advantages and other features of the present invention will become more apparent upon reading of the following non-restrictive description of preferred embodiments thereof, given for the purpose of exemplification only with reference to the accompanying drawings.

DETAILED DESCRIPTION OF PREFERRED EMBODIMENTS OF THE INVENTION

Figure 1:
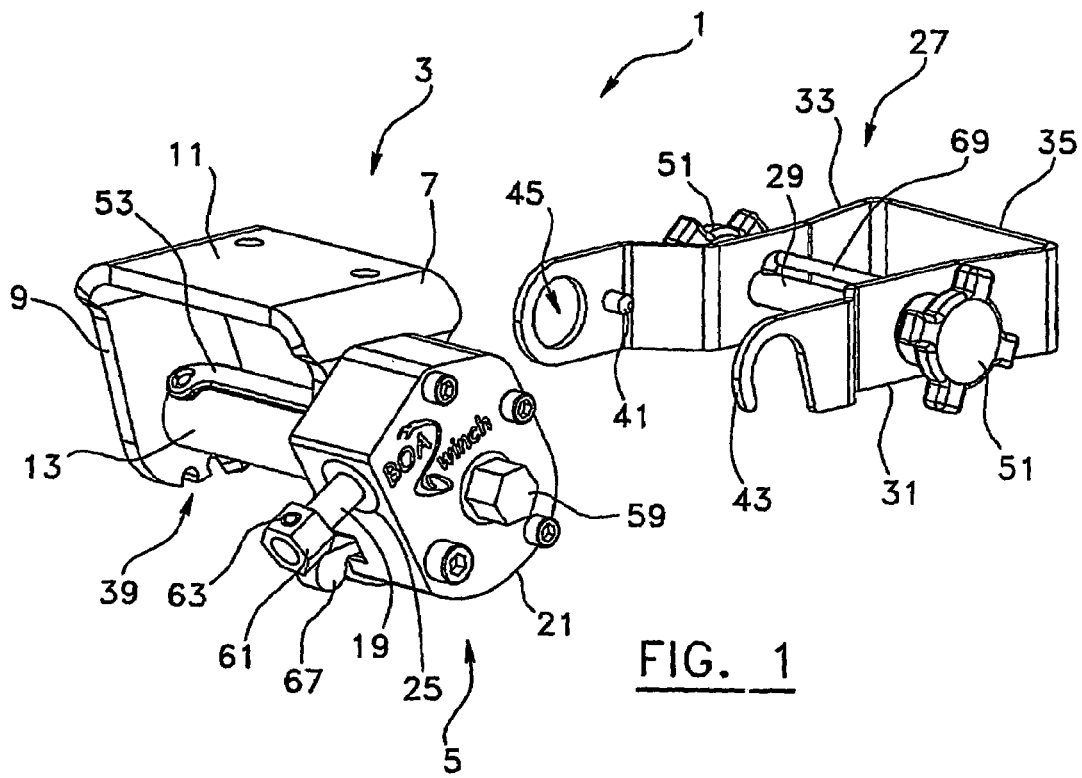
FIG. 1 is a side perspective view of a winch according to a preferred embodiment of the present invention, the winding assembly of the winch being shown detached from the tightening assembly which is shown provided with a gear assembly.

In the following description, the same numerical references refer to similar elements. The embodiments shown in the figures are preferred.

Moreover, although the present invention was primarily designed for use with a flatbed truck, it may be used with other types of transportation vehicles and objects, such as railcars for example and the like, and in other fields, as apparent to a person skilled in the art. For this reason, expressions such as "flatbed", "truck", "railcar", etc., used herein should not be taken as to limit the scope of the present invention and includes all other kinds of objects or fields with which the present invention could be used and may be useful.

Moreover, in the context of the present invention, the expressions "winch", "device", "assembly", "system", and any other equivalent expression and/or compound words thereof known in the art will be used interchangeably. Furthermore, the same applies for any other mutually equivalent expressions, such as "belt", "chain", and "strap", or "fasten" and "secure", as well as "cargo" and "load", or even "rail" and "track", for example, as also apparent to a person skilled in the art.

In addition, although the preferred embodiment of the present invention as illustrated in the accompanying drawings may comprise various components such as pins, notches, washers, rods, knobs, heads, a clamping lamella, a hook, holes, a ratchet wheel, a pawl arm, etc., and although the preferred embodiment of the winch 1 as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the winch 1 and corresponding parts according to the present invention, as will be briefly explained hereinafter and as can be easily inferred herefrom, without departing from the scope of the invention.

Broadly described, the present invention, as illustrated in the accompanying drawings, relates to a winch 1 to be used as a securement device used for securing cargo during transportation on flatbeds, railcars, and the like, as is well known in the art. The present winch 1 may be used for fastening various types of straps, belts, and/or chains used to hold down different types of loads during the transportation thereof on such vehicles. The present winch 1 is preferably of simple design and inexpensive to manufacture. As will be shown hereinbelow, the present winch 1 possesses several advantages when compared to conventional winches known in the art.

According to the present invention, and as better shown in FIGS. 1 to 16, the winch 1 comprises a tightening assembly 3 and a gear assembly 5. The tightening assembly 3 comprises a support structure having first and second support flanges 7,9 and a cross member 11 extending between the support flanges 7,9. The cross member 11 is devised for mounting onto a corresponding side track of the vehicle, by suitable means, as is well known in the art. The tightening assembly 3 also comprises a tightening reel 13 for receiving a portion of the strap 15 to be tightened about said reel, the tightening reel 13 being pivotally mounted onto the first and second support flanges 7,9, as can be easily understood when referring to FIGS. 5 and 6, and FIGS. 10 and 11.

Figure 14:
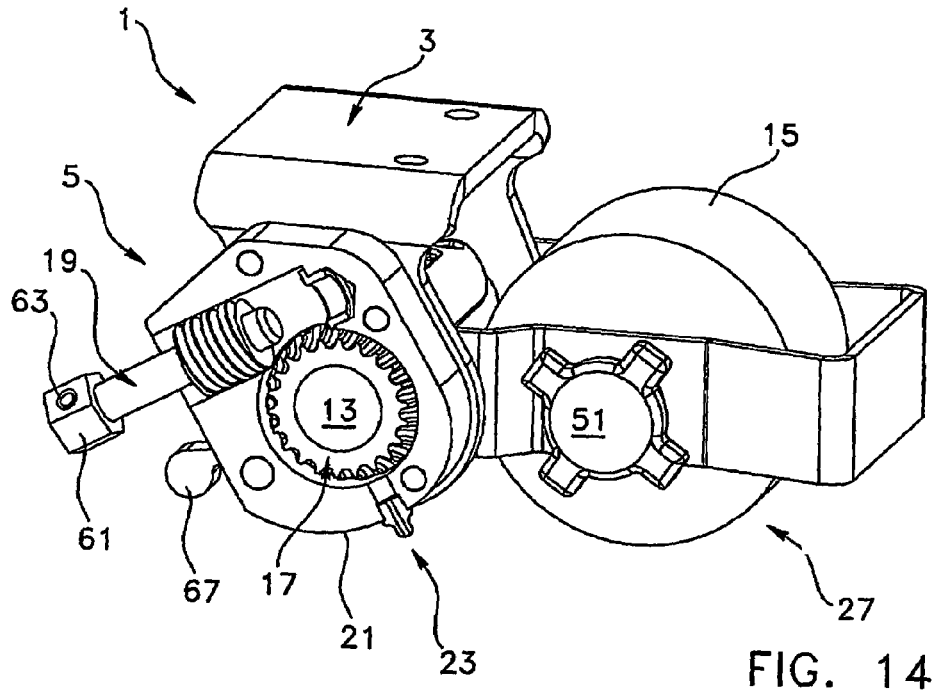
FIG. 14 is a perspective view of the winch according to the present invention, a sectional view of the gear assembly being shown, with the worm being in the first configuration.
Figure 15:
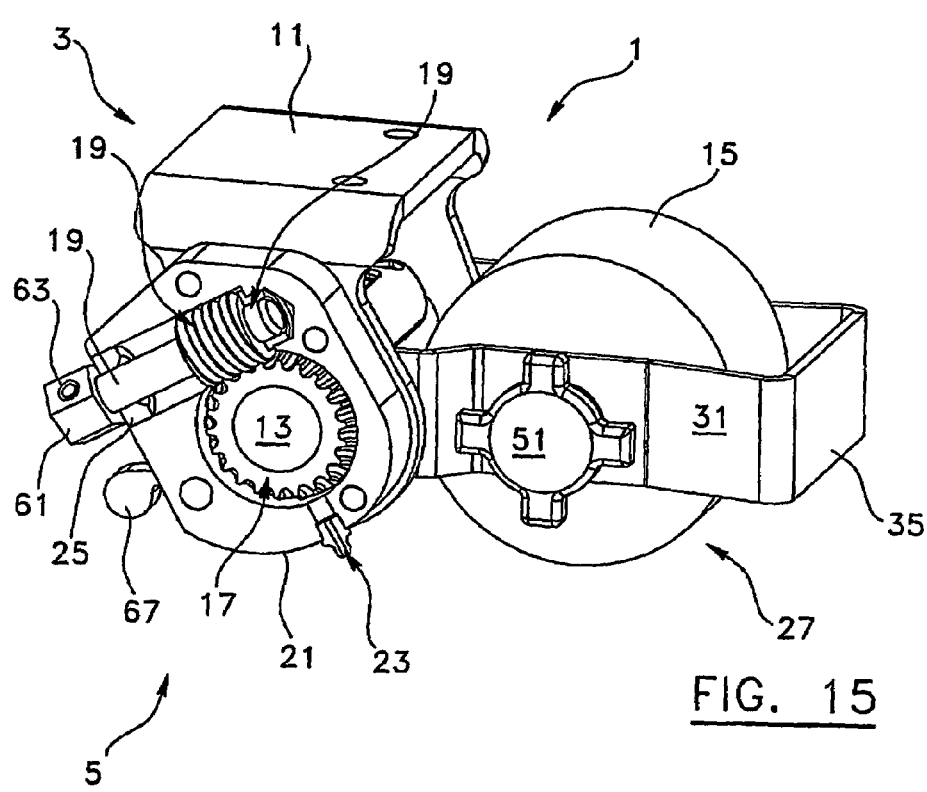
FIG. 15 is another perspective view of the winch of FIG. 14, the worm being shown in the second configuration.

As better shown in FIGS. 14 and 15, the gear assembly 5 is operatively connected to the tightening assembly 3, and comprises a gear 17, a worm 19, and a casing 21. The gear 17 is securely mounted about the tightening reel 13 so as to rotate with said reel. The worm 19 is positioned adjacent to the gear 17 and operable between a first configuration where the worm 19 is away from the gear 17, and a second configuration where the worm 19 is threadedly engaged with the gear 17 so that a rotation of the worm 19 drives the tightening reel 13 via the gear 17, along opposite directions of rotation, for either fastening or unfastening the strap 15 onto the tightening reel 13. It is worth mentioning that the gear assembly 5 is preferably devised so that if the worm 19 is in the second configuration, it may be triggered automatically back into the first configuration when rotating the worm 19 in a direction corresponding to an untightening of the strap 15.

The casing 21 is mounted onto the first support flange 7 of the support structure and has corresponding recesses for containing the gear 17 and worm 19 respectively. The casing 21 is preferably devised so as to enclose the gear 17 and the worm 19 and to protect them from water, sand, dust and other debris. The casing 21 may also comprise a lubrication point 23, as better shown in FIGS. 14 and 15, so as to introduce a suitable lubrication material, such as grease for example, into the worm-gear assembly, with a suitable lubrication device, such a standard "grease gun" for example. Preferably, the recess of the casing 21 containing the worm 19 is a bore, and the worm 19 is preferably slidably movable within said bore so as to facilitate operation of the worm 19 between its first and second configurations. The bore may be provided with a suitable bushing 25, as better illustrated in FIGS. 1 and 15. It is worth mentioning that the casing 21 may take on other shapes and forms and may consist of other components, so long as it provides a coupling and an uncoupling mode of the worm 19 onto the gear 17, as apparent to a person skilled in the art. For example, the casing 21 may comprise a pivoting support containing the worm 19 and being pivotable between first and second positions corresponding to the first and second configurations of the worm 19 where it is respectively uncoupled and coupled onto the gear 17.

Preferably, the gear 17 is welded onto the tightening reel 13 and is provided with suitable gear teeth, preferably driven by the worm 19 and allowing the rotation of the tightening reel 13 in the desired direction via a rotation of the worm 19 when in the second configuration, so as to transmit a suitable tightening force thereto.

According to the present invention, as better shown in FIGS. 1 to 7, the winch 1 also preferably comprises a winding assembly 27 being removably mountable onto the tightening assembly 3. The winding assembly 27 comprises a support structure and a winding reel 29. The support structure has first and second extensions 31,33 and a cross member 35 extending between the extensions, the ends of the extensions being removably mountable onto the tightening assembly 3. The winding reel 29 is used for receiving an excess portion of the strap 15 to be wound about the same, and is pivotally mounted onto the first and second extensions of the winding assembly 27.

Preferably, the support structures of the tightening and winding assemblies are substantially U-shaped. In regards to the support structure of the tightening assembly 3, it is preferably a piece in the shape of an inverted "U" to which the components of the tightening assembly 3 and gear assembly 5 are operatively assembled or fixed to. Its faces or sides are preferably provided with corresponding holes through which the tightening reel 13 is inserted and pivotally mounted. Preferably, there is two grooves on each side of the support structure of the tightening assembly 3 which allow to insert the winch 1 on the side rails of a trailer and to make it slide to a desired position therealong. As previously mentioned, the support structure of the tightening assembly 3 may be provided with other suitable means for adequately mounting the winch 1 onto a corresponding rail or track of a transportation vehicle, as is well known in the art.

In regards to the support structure of the winding assembly 27, it is preferably a piece in the shape of a "U" also to which all the components of the winding assembly 27 are operatively assembled or fixed to. Its faces or sides are preferably provided with corresponding holes through which the winding reel 29 is inserted and pivotally mounted.

Preferably, the ends of the extensions of the winding assembly 27 are removably mountable onto the tightening reel 13 of the tightening assembly 3, and the winding assembly 27 is pivotably movable with respect to said tightening assembly 3. Accordingly, the winch 1 preferably further comprises adjustment means 37 for selectively adjusting the positioning of the winding assembly 27 with respect to the tightening assembly 3. As better shown in FIGS. 5 and 6, the adjustment means 37 preferably comprise a plurality of notches 37 provided along a peripheral side portion of the second support flange 9 of the tightening assembly 3, and a locking pin 41 provided on the second extension 33 of the support structure of the winding assembly 27 for removably inserting into a corresponding notch 37 of the peripheral side portion of the second support flange 9 of the tightening assembly 3 so as to lock the winding assembly 27 into a corresponding position with respect to the tightening assembly 3. It is worth mentioning that other suitable adjustment means 37 may be used with the winch 1 according to the present invention, as apparent to a person skilled in the art.

Figure 16:
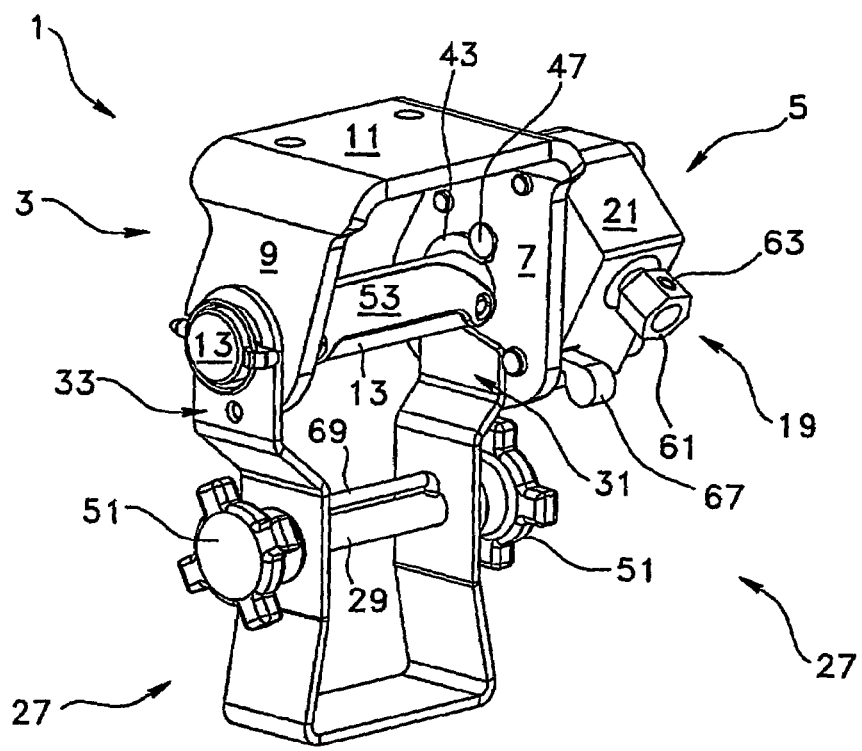
FIG. 16 is another side perspective view of what is shown in FIG. 3, the winch being shown with the worm in the second configuration and with the tightening reel having been rotated.
Figure 17:
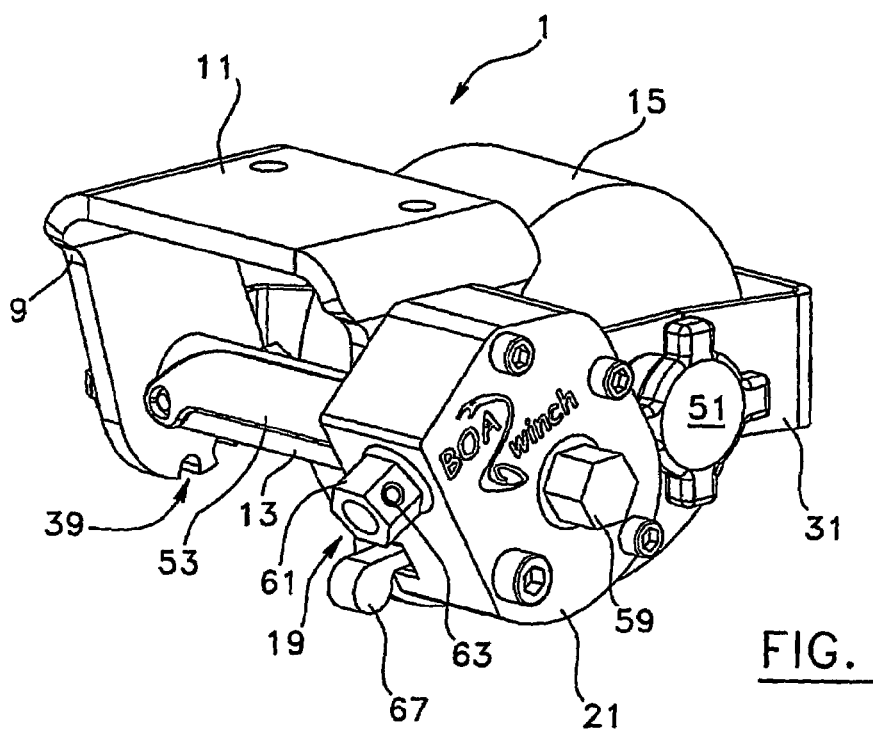
FIG. 17 is another perspective of the winch of FIG. 2, the winch being shown now with a strap wound about the winding reel of the winding assembly.
Figure 18:
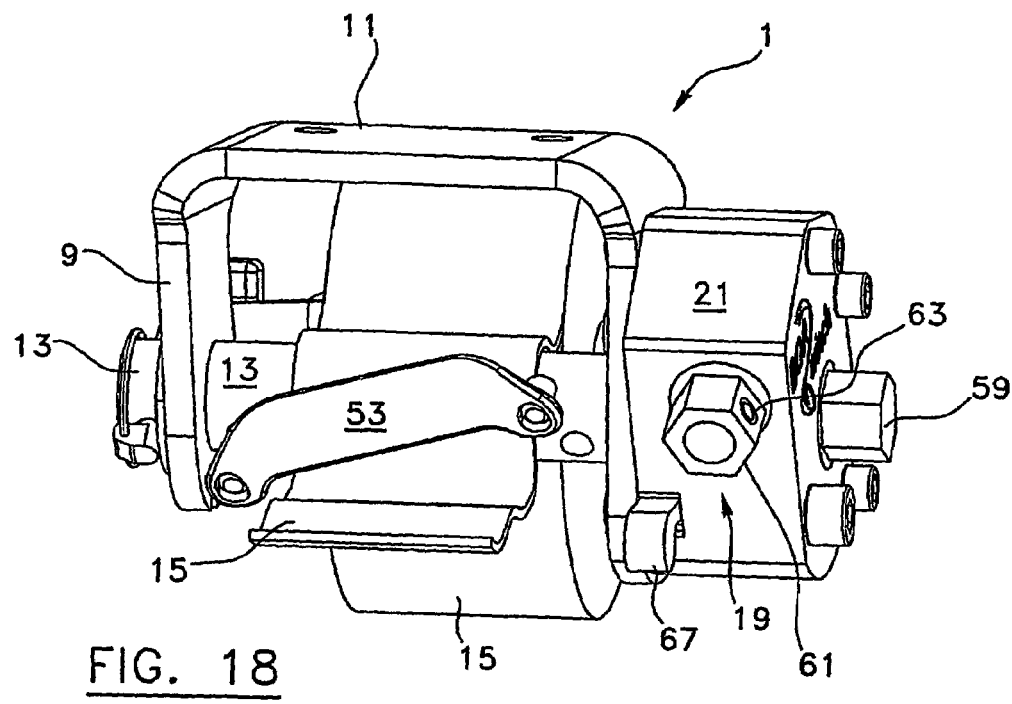
FIG. 18 is another perspective of the winch of FIG. 17, the winch being shown now with the clamping lamella in a retracted configuration and with an end portion of the strap being movable with respect to the tightening reel.
Figure 19:
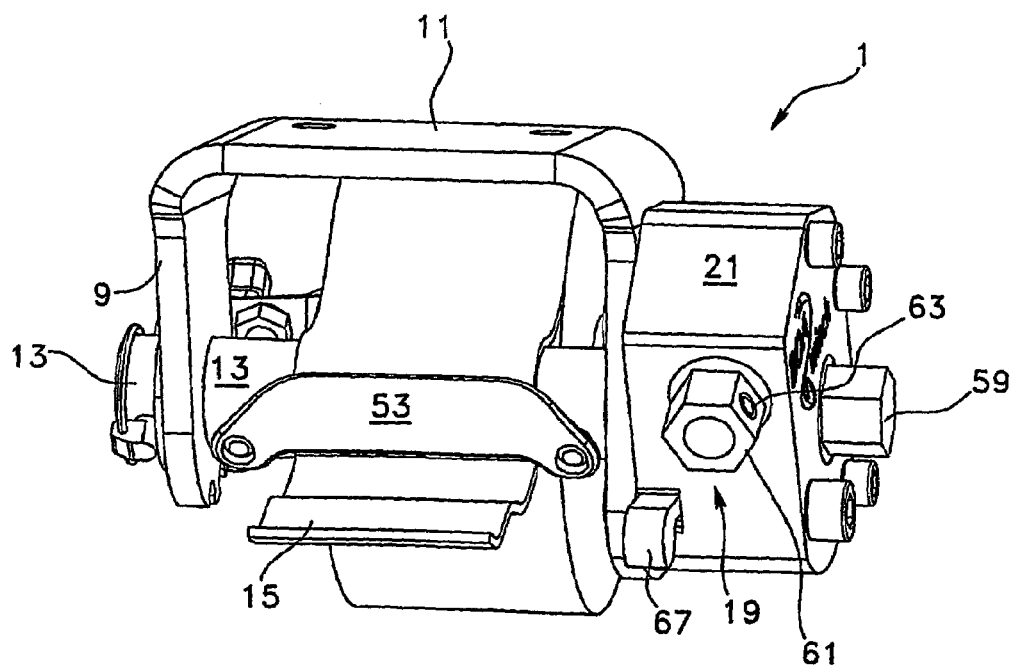
FIG. 19 is another perspective of the winch of FIG. 18, the winch being shown now with the clamping lamella in a clamping configuration and with a segment of strap being clamped by said lamella.
Figure 20:
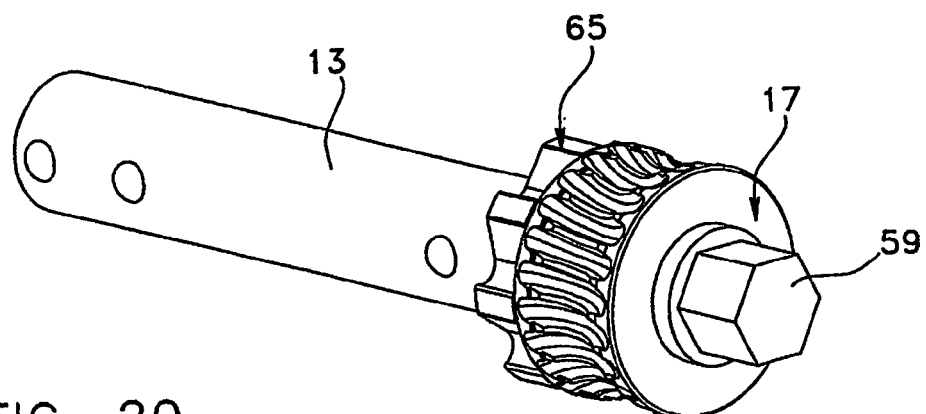
FIG. 20 is a perspective view of a tightening reel according to a preferred embodiment of the present invention, the tightening reel being shown provided with a ratchet wheel, a gear, and a tightening head.

Preferably, the ends of the first and second extensions of the winding assembly 27 are provided with a hook 43 and a hole 45 respectively, the hook 43 being shaped and sized for hooking the first extension 31 onto the tightening reel 13, between the first and second support flanges 7,9 of the support structure of the tightening assembly 3, adjacent to the first support flange 7, and the hole 45 being shaped and sized for mounting the second extension 33 onto an end of the tightening reel 13, adjacent to an outer face of the second support flange 9, and can be easily understood when referring to FIGS. 1 and 16.

Preferably also, as better shown in FIG. 16, the winch 1 comprises an abutment pin 47 provided on an inner face of the first support flange 7 of the tightening assembly 3, said abutment pin 47 cooperating with a curved portion of the hook 43 of the first extension 31, the abutment pin 47 being positioned on said inner face and the curved portion being shaped and sized so as to prevent the hook 43 from being removed from the tightening reel 13 along a predetermined range of rotation of the winding assembly 27 with respect to the tightening assembly 3. Indeed, as illustrated in FIGS. 1 to 13, the winding assembly 27 may be adjustably pivoted with respect to the tightening assembly 3 without the hook 43 of the first extension 31 not removing itself from the tightening reel 13 due to its abutment relationship with the abutment pin 47, but said winding assembly 27 may be removably detached from the tightening assembly 3 by pivoting the winding assembly 27 at a certain angle with respect to the tightening assembly 3 where the curved portion of the hook 43 of the first extension 31 is no longer in an abutment relationship with the abutment pin 47, thereby enabling the winding assembly 27 to be removed from the tightening assembly 3 when the end of the second extension 33 of the winding assembly 27 is removed from the end of the tightening reel 13 of the tightening assembly 3, as can be easily understood when referring to FIGS. 1 and 16. This preferably results also from the fact that the support structure of the winding assembly 27 is made of a suitable metallic material, containing certain resilient properties, and having a pre-established shape for mounting onto the tightening reel 13 of the tightening assembly 3. The end of the tightening reel 13 on which the end of the second extension 33 of the winding assembly 27 is mounted may be provided with a suitable pin being removably insertable into the end of the tightening reel 13 for selectively preventing the end of the second extension 33 of the winding assembly 27 from being removed from said tightening reel 13. As will be explained hereinbelow, the winding assembly 27 may comprise suitable knobs 51 for enabling the U-shaped support structure of the winding assembly 27 to be spread out so as to enable the end of the second extension 33 to be removed from the end of the tightening reel 13. The fact that the winding assembly 27, with the possibility of a corresponding strap 15 being wound about the winding reel 29, may be easily removable from the tightening assembly 3 and similarly, easily mountable thereon, is particularly advantageous in that, if the straps 15 of a given vehicle need to be changed by other types of straps 15, or stored for that matter, the necessary changes can be made by changing the winding assemblies for example, or removing in the case of storing, which is done very easily, quickly, and easily as briefly explained hereinabove. Indeed, the winding assemblies can be seen as strap "cartridges". In contrast, with conventional winches, each strap 15 would have to be unwound from its corresponding tightening reel, which is extremely tedious.

According to the preferred embodiment of the present invention, as better shown in FIGS. 17 to 19, and FIGS. 21 to 25, the tightening assembly 3 comprises a clamping lamella 53 removably mounted onto the tightening reel 13, the clamping lamella 53 being provided with at least one leg 55 mounted into the tightening reel 13 and being movable thereabout, the clamping lamella 53 being operable between a first configuration where it is positioned away from the tightening reel 13 so as to enable a portion of the strap 15 to be brought onto and removed from the tightening reel 13, and a second configuration where the clamping lamella 53 is positioned with respect to the tightening reel 13 so as to define a slit between the lamella 53 and the tightening reel 13 for receiving a segment of the strap 15 thereinbetween, and where further rotation of the tightening reel 13, and further rotation of the strap 15 about the clamping lamella 53, biases the clamping lamella 53 towards the tightening reel 13 for clamping the strap segment against the tightening reel 13. The clamping lamella 53 is preferably devised to enable to quickly attach and detach the strap 15 from the tightening reel 13, irrespectively of the end piece (e.g. a chain, a hook, etc.) attached to the end portion of the strap 15.

FIGS. 21 to 25 illustrate different preferred embodiments of the clamping lamella 53 according to the present invention.

Figure 21:
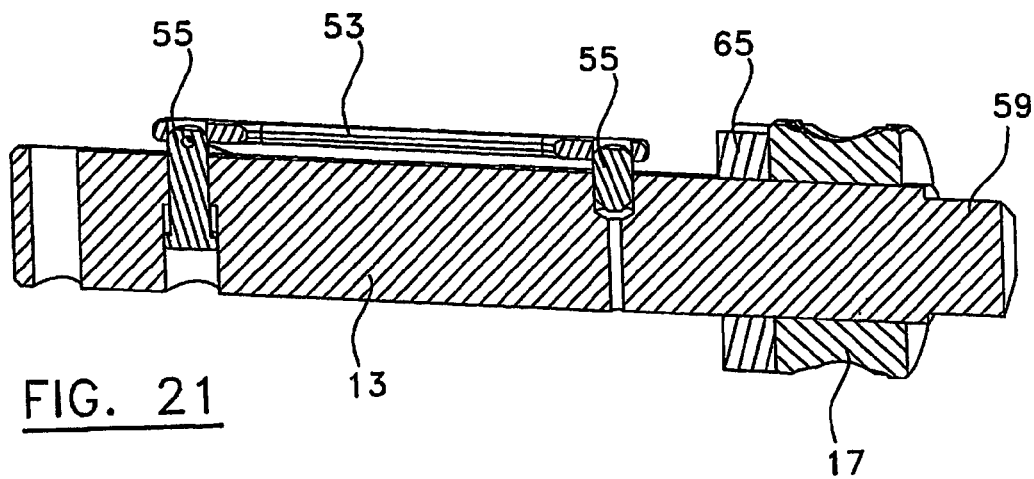
FIG. 21 is a sectional view of what is shown in FIG. 20, the tightening reel being shown provided with a clamping lamella and corresponding recesses according to a first preferred embodiment of the present invention.

Referring to FIG. 21, there is shown one particular embodiment of a clamping lamella 53 where the longest of the legs 55 is provided with an abutment portion at its extremity preventing it from being detached from the corresponding recess of the tightening reel 13.

Figure 22:
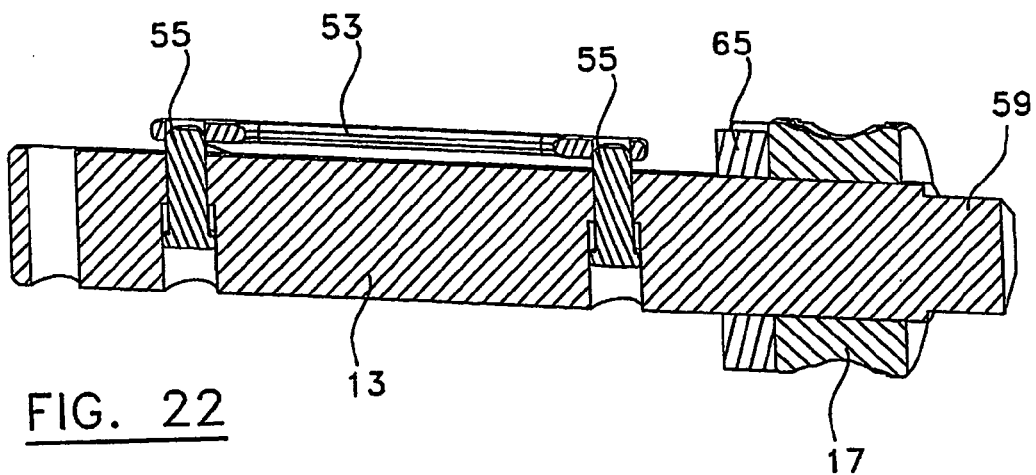
FIG. 22 is a sectional view of what is shown in FIG. 20, the tightening reel being shown provided with a clamping lamella and corresponding recesses according to a second preferred embodiment of the present invention.

Referring to FIG. 22, there is shown another preferred embodiment of a clamping lamella 53 where the two legs 55 are each provided with an abutment portion at their extremities preventing them from being detached from the reel.

Figure 23:
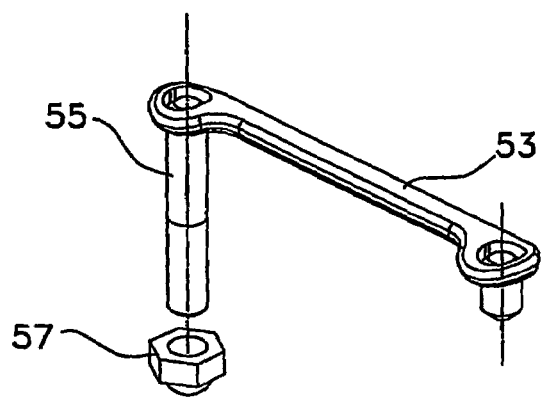
FIG. 23 is an exploded perspective view of the components of a clamping lamella according to a third preferred embodiment of the present invention.
Figure 25:
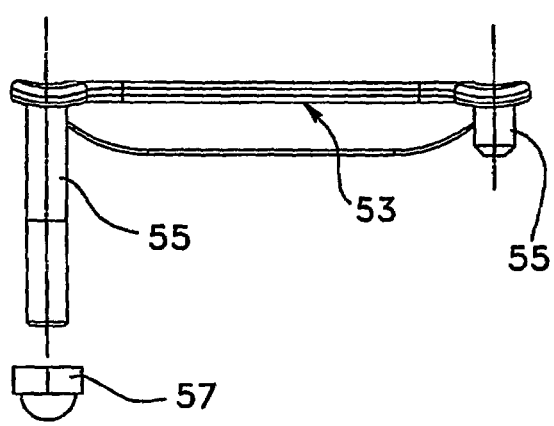
FIG. 25 is a front elevational view of what is shown in FIG. 23, the clamping device being shown provided with a biasing means.
Figure 24:
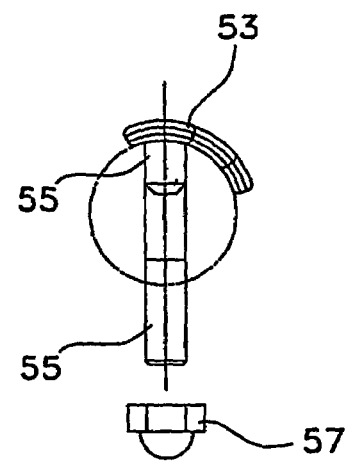
FIG. 24 is side elevational view of what is shown in FIG. 23.

Referring now to FIGS. 23 to 25, there is shown another preferred embodiment of a clamping lamella 53 where the longest leg 55 is preferably provided with threading at its extremity and is preferably inserted through the tightening reel 13 and secured with a nut 57. The smallest leg 55 is preferably inserted into a hole on the reel and is intended to block the movement of the lamella 53 in a tightening configuration. The hole in which the longest of the legs 55 is inserted is preferably bored so as to enable a limited movement of the lamella 53 in the axis of the legs 55 and thus enable it to pivot about the reel. This configuration enables namely to be able to remove quickly the belt from the tightening reel 13 simply by raising the lamella 53. The lamella 53 also enables to remove the winding assembly 27, and corresponding strap 15, from the tightening assembly 3 by unscrewing the nut 57.

Figure 2:
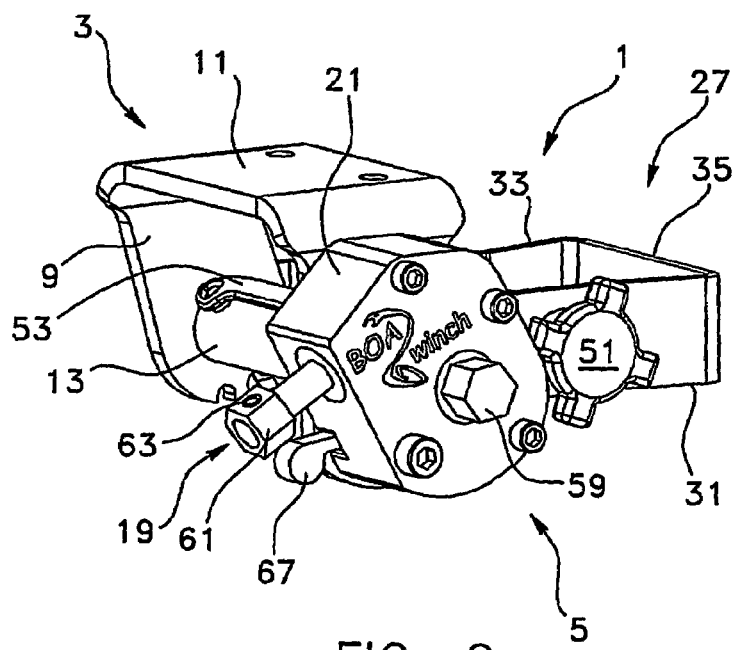
FIG. 2 is a side perspective view of the winch of FIG. 1, the winch being shown now with the winding assembly mounted onto the tightening assembly.
Figure 3:
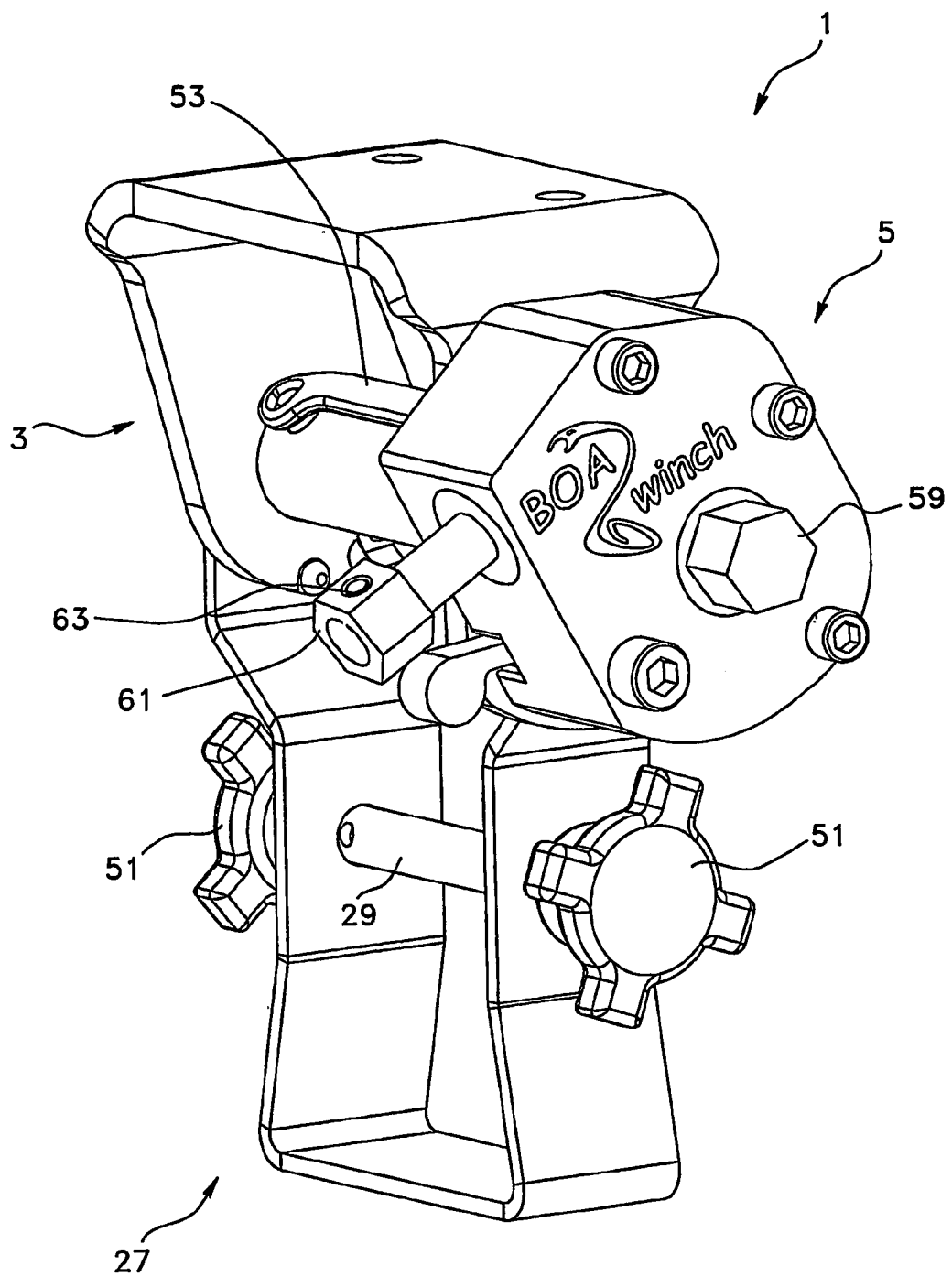
FIG. 3 is a side perspective view of the winch of FIG. 2, the winch being shown now with the winding assembly in a vertical position with respect to the tightening assembly.
Figure 4:
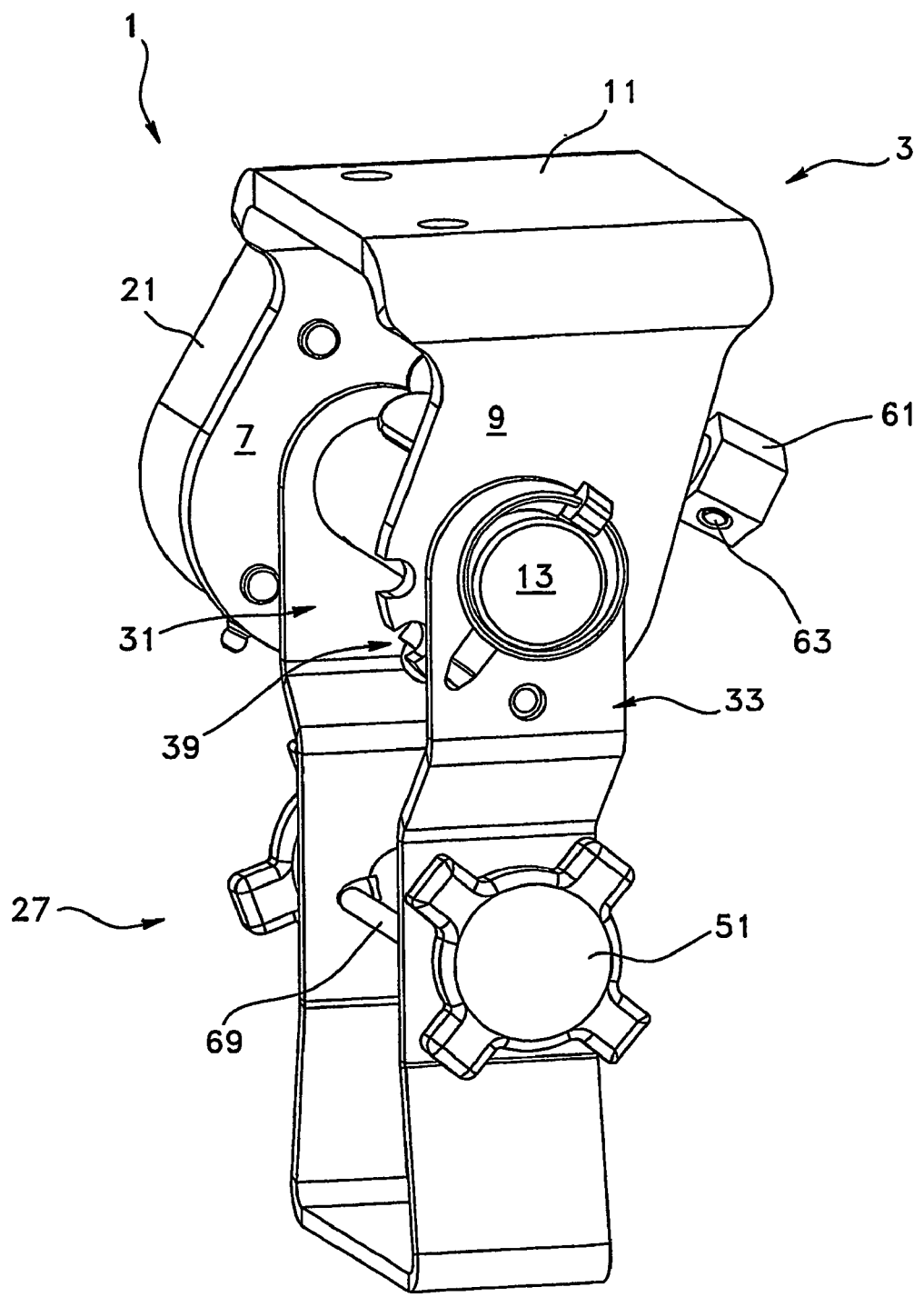
FIG. 4 is another side perspective view of what is shown in FIG. 3.
Figure 5:
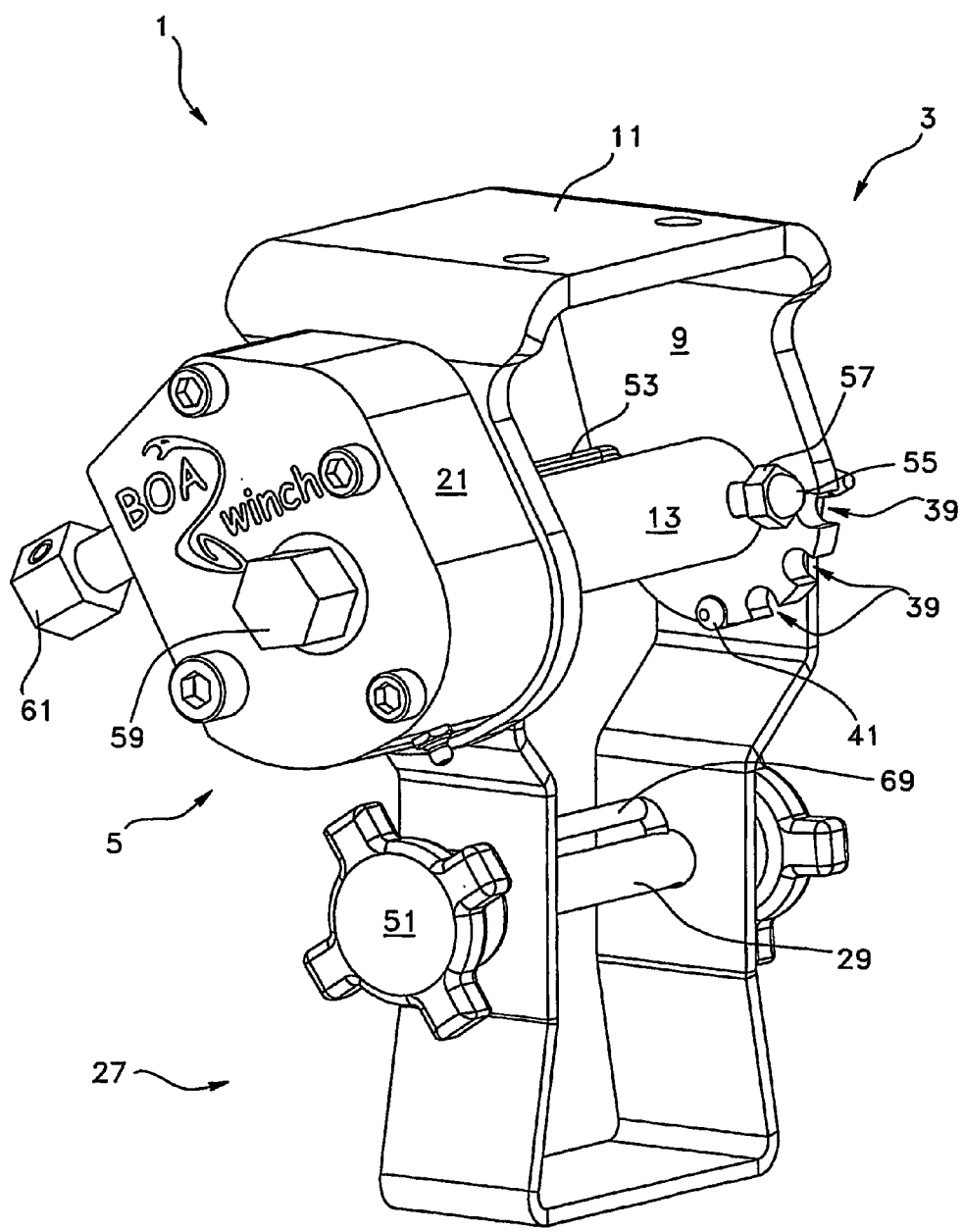
FIG. 5 is another side perspective view of what is shown in FIG. 4.
Figure 6:
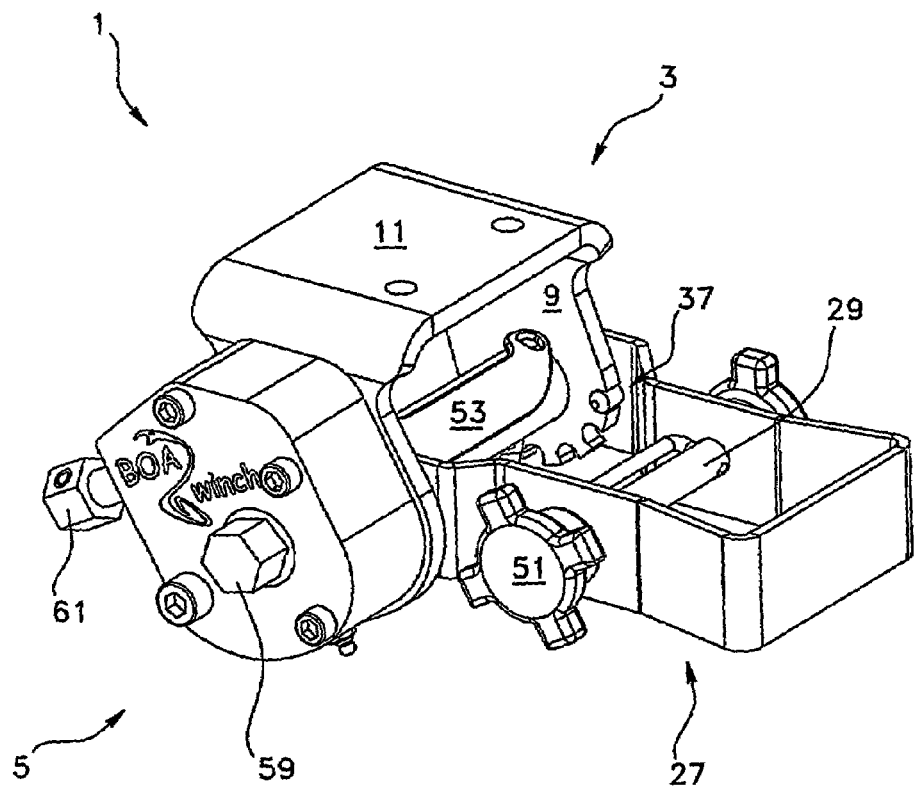
FIG. 6 is a side perspective view of the winch of FIG. 5, the winch being shown now with the winding assembly in a retracted horizontal position with respect to the tightening assembly, and with the tightening reel having been rotated.
Figure 7:
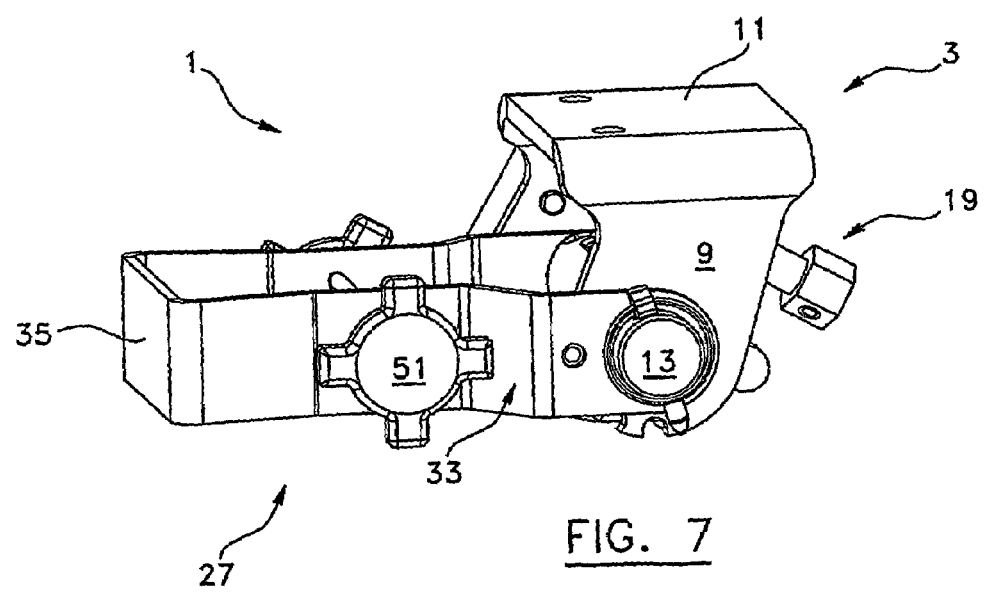
FIG. 7 is another side perspective view of what is shown in FIG. 6.

Referring now to FIGS. 1 to 3, the ends of the tightening reel 13 and of the worm 19 are preferably provided with corresponding heads 59,61 for receiving a socket of a corresponding tool, such as a cranking tool. Preferably, the head 59 of the tightening reel 13 is securely mounted (i.e. by welding, machining, and the like) onto the tightening reel 13. It allows to drive the tightening reel 13 via a rotation of its head 59. Preferably, the head 61 of the worm 19 is non-securely mounted thereon (i.e. press fitting, and the like) and is preferably provided with a shear pin 63 extending between said head 61 and the end of the worm 19 on which the head 61 is mounted, as can be easily understood when referring to FIGS. 1, 12 and 13. Activated in both directions by rotating its head 61, the worm 19 drives the tightening reel 13 via the gear 17 so as to transmit a tightening force onto the strap 15. Preferably also, the shear pin 63 protects the strap 15 and the tightening mechanism from damages caused by an excessive tightening, by breaking itself at a predetermined tension, as can be easily understood by a person skilled in the art.

Preferably also, one end of the winding reel 29 may be provided with a corresponding head for receiving a socket of the cranking tool, said corresponding head being securely mounted to the winding reel 29 so as to rotate therewith, and another end of the winding reel 29 may be provided with a knob 51 being theadedly mountable onto said another end of the winding reel 29. As better shown in FIGS. 3 to 13, a pair of knobs 51 are preferably used for manually winding the belt about its winding reel 29. A first handle or knob 51 is preferably securely mounted, such as by welding, for example, to an extremity of the winding reel 29 enabling the winding of the strap 15. A second handle or knob 51 is preferably screwed into the other extremity of the winding reel 29 for enabling to securely tighten the winding assembly 27 so as to avoid that the belt unwinds once wounded. Furthermore, this second handle is preferably further devised so that an untightening thereof enables to spread apart the ends of the extensions of the support structure of the winding assembly 27 for removably mounting and/or detaching the winding assembly 27 onto and/or from the tightening assembly 3.

The different heads of the winch 1 preferably have a same hexagonal shape. Preferably, the winch 1 is operated with a crank ratchet provided with an hexagonal socket coming to couple on the corresponding heads, and allowing to pass on the necessary force to make the corresponding components turn in a direction or in the other one. Thus, the heads are preferably shaped so as to be operated by a same tool. It worth mentioning that some heads (e.g. the head of the tightening reel 13, the head of the winding reel 29, etc.) may be operated by other suitable means, such a manually for example, as apparent to a person skilled in the art.

According to a particular embodiment of the present invention, the gear assembly 5 may comprise a ratchet wheel 65 and a pawl lever 67. The ratchet wheel 65 is preferably securely mounted about the tightening reel 13 so as to rotate with said reel, the ratchet wheel 65 being provided with a plurality of peripheral teeth. The pawl lever 67 preferably has an extremity positioned adjacent to the ratchet wheel 65 and operable between a first configuration where the extremity of the pawl lever 67 is away from the ratchet wheel 65, and a second configuration where the extremity of the pawl lever 67 is inserted into a corresponding tooth of the ratchet wheel 65, thereby preventing the ratchet wheel 65 and the tightening wheel from further rotating along a given direction.

Figure 26:
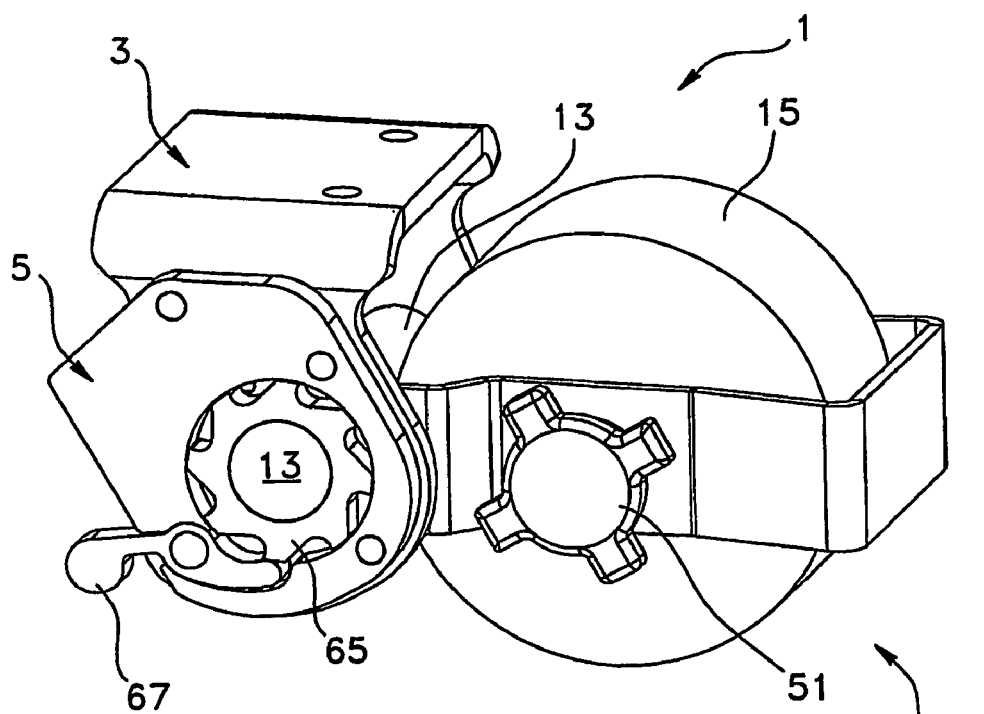
FIG. 26 is a perspective view of the winch according to the present invention, a sectional view of the gear assembly being shown, with the pawl arm being shown in its first configuration.
Figure 27:
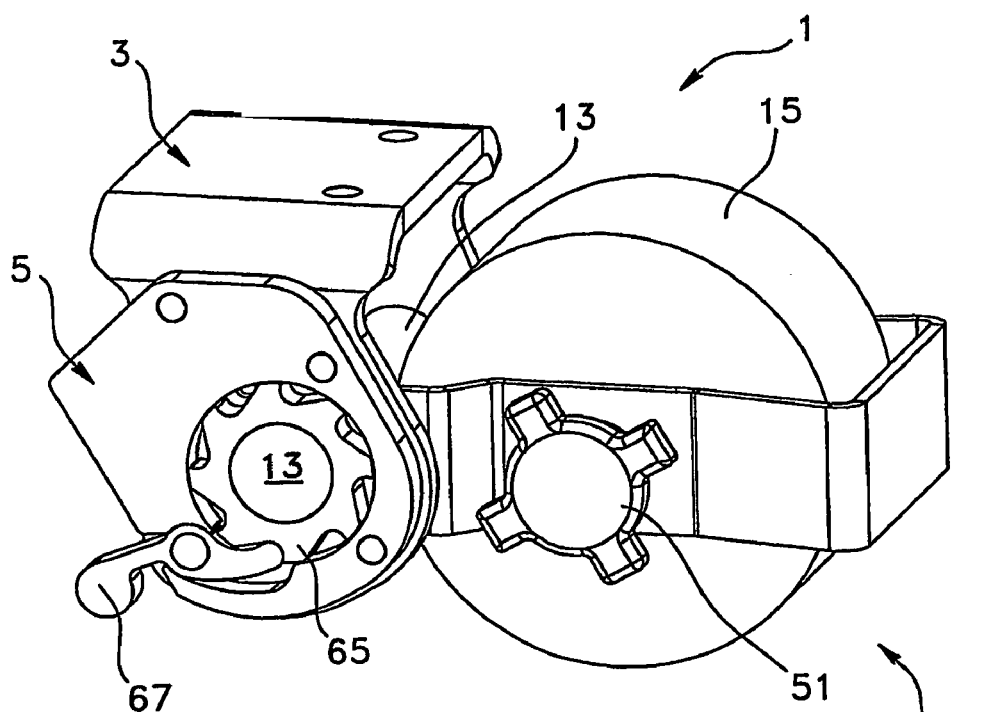
FIG. 27 is another perspective view of the winch of FIG. 26, the pawl arm being shown now in its second configuration.

Preferably, as shown in FIG. 26, the pawl lever 67 can be disengaged so to allow the ratchet wheel 65 to turn in both directions. However, when engaged onto the ratchet wheel 65, as shown in FIG. 27, the pawl lever 67 blocks the wheel and allows its rotation in the direction of tightening only to avoid that the belt be unrolled. The pawl lever 67 may be shaped and sized so as to be biased by gravity in order to be biased into the second configuration, the first configuration being only activated manually by an operator for example. It is worth mentioning also that according to the present invention, the presence of the ratchet wheel 65 is not necessary since the gear assembly 5 is devised so as to maintain the tightening assembly 3 in a corresponding tightened configuration, due to the nature of the interaction between the gear 17 and the worm 19 when in the second configuration, which can be seen as a locking and/or driving configuration of the worm 19 onto the gear 17, and thus onto the tightening reel 13.

Preferably, the winch 1 comprises with a rod 69 mounted onto the winding reel 29 so as to define a slit between the rod 69 and the winding reel 29, said slit being shaped and sized for receiving an end portion of the strap 15. This enables namely to facilitate the winding of the excess portion of the strap 15 onto the winding assembly 27.

As can be easily understood from the above-described, the preferred embodiment of winch 1 illustrated in the accompanying drawings is preferably intended for minimizing components and assembling steps, while providing a suitable manner for easily, quickly and safely fastening a load with a winch 1 and corresponding strap 15 onto a transportation vehicle.

Moreover, according to another aspect of the present invention, there is also provided a transportation vehicle provided with a winch 1 such as the ones described and illustrated herein, as exemplified in the accompanying figures.

It is worth mentioning that according to yet another aspect of the present invention, there is also provided a method of operating the above-described winch 1, i.e. a method for fastening a load with a winch 1 and corresponding strap 15 onto a transportation vehicle, the method comprising the steps of: a) providing the above-described transportation vehicle; b) mounting the winch 1 onto a corresponding side track of the transportation vehicle; c) attaching a first extremity of the strap 15 onto an anchoring point; d) clamping a portion of the strap 15 about the tightening reel 13; and e) rotating the tightening reel 13 so as to tighten the strap 15.

Preferably, step e) comprises the step of: f) operating the worm 19 in its second configuration so as rotate the tightening reel 13 via the gear 17. Preferably also, the method further comprises the steps of: g) mounting a winding assembly 27 onto the tightening assembly 3 of the winch 1; and h) winding an excess portion of the strap 15 onto the winding reel 29 of the winding assembly 27.

The winch 1 according to the present invention is preferably inserted onto a corresponding rail on a proper side of the trailer and positioned at a suitable location for securing the cargo on the trailer. Preferably, a plurality of such winches 1 is used, as apparent to a person skilled in the art. The present winch 1 may be inserted onto the rail by means of grooves or may be inserted on the rail by means of an optional plate welded on the top of the winch 1, as well as by other suitable means, as previously mentioned and as apparent to a person skilled in the art.

Figure 8:
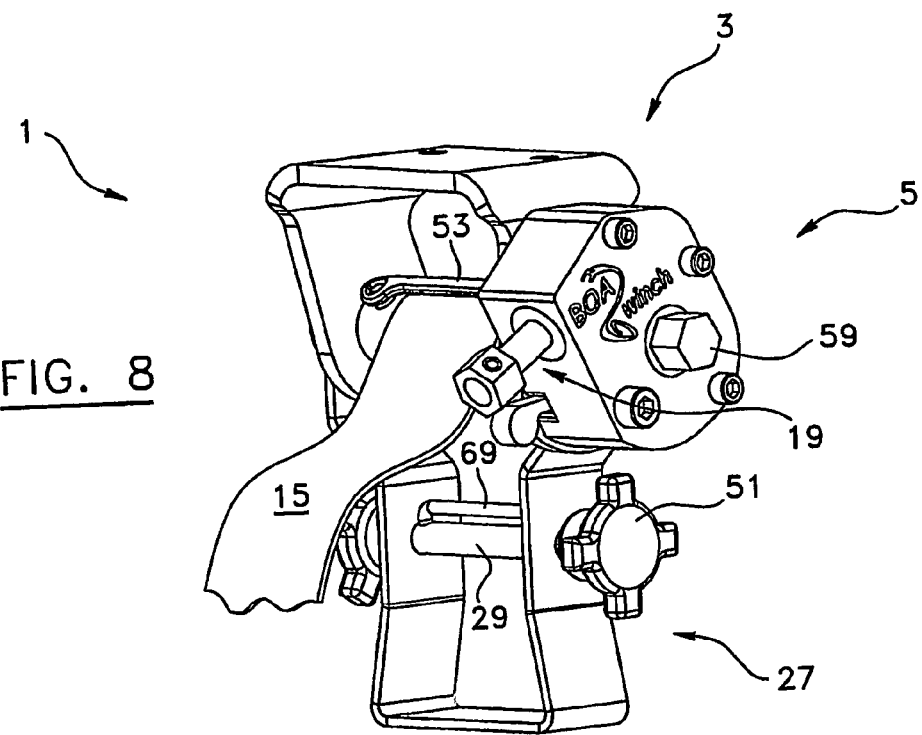
FIG. 8 is another perspective view of the winch of FIG. 3, the winch being shown now with an end portion of a strap from a vehicle being inserted into the slit defined between the clamping lamella and the tightening reel, and with the worm in the first configuration.
Figure 9:
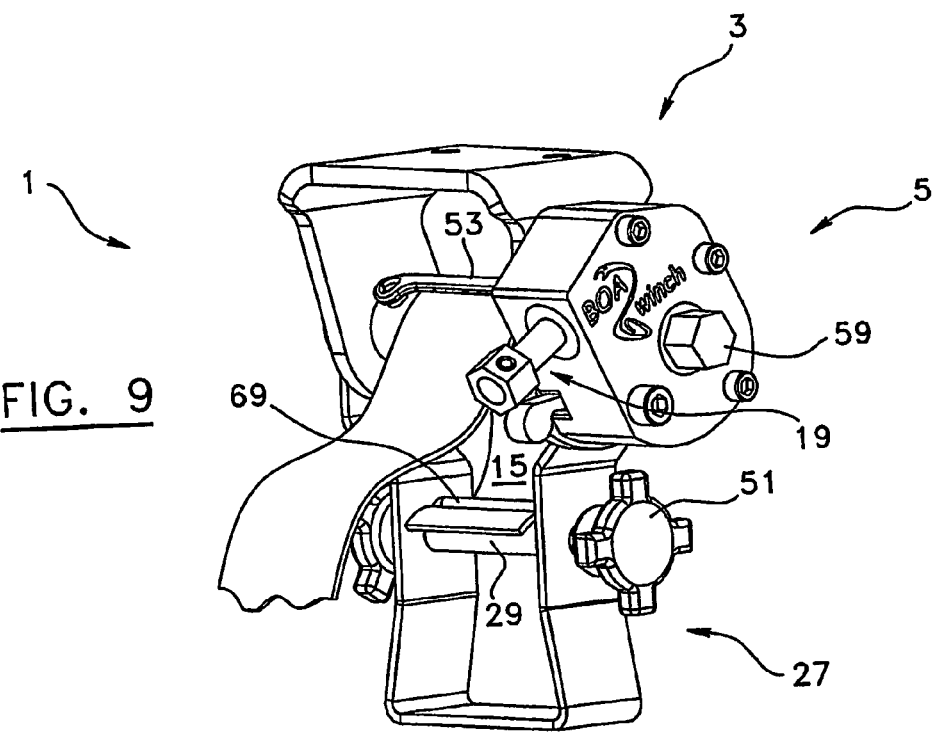
FIG. 9 is another perspective view of the winch of FIG. 8, the winch being shown now with the end portion of the strap being wound about a portion of the tightening reel and inserted into the slit defined between the rod and the winding reel.
Figure 10:
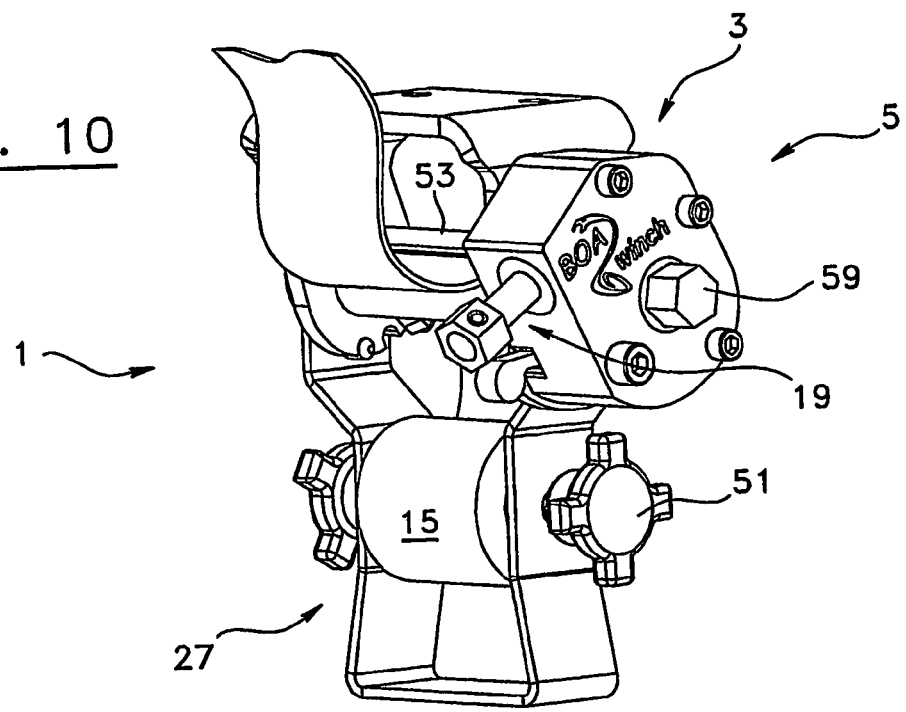
FIG. 10 is another perspective view of the winch of FIG. 9, the winch being shown now with an excess portion of the strap being wound about the winding reel.

According to a preferred embodiment of the present invention, better illustrated in FIGS. 8 to 13, the installation of a strap 15 on a winch 1 and the fastening of said strap 15 onto a load to be secured on a vehicle with the winch 1 is preferably carried out as follows. Firstly, the strap 15 is inserted through a slit or opening of the tightening reel 13. FIG. 8 illustrates an end portion of the strap 15 from a vehicle being inserted into the slit defined between the clamping lamella 53 and the tightening reel 13, the worm 19 of the winch 1 being preferably in the first configuration. The strap 15 is then inserted through the slit of the winding reel 29, as better shown in FIG. 9. Indeed, this figure illustrates the winch 1 being shown now with the end portion of the strap 15 being wound about a portion of the tightening reel 13 and inserted into the slit defined between the rod 69 and the winding reel 29. These steps are generally done only at the first installation of the strap 15 on the winch 1. Preferably, the belt is then rolled-up by means of the handle (or head) on the winding reel 29 of the winch 1, as can be easily understood from FIG. 10. Indeed, this figure illustrates the winch 1 with an excess portion of the strap 15 being wound about the winding reel 29. This winding step is very fast when compared to what is possible with conventional winches because the handle (or head) of the winding reel 29 may be easily and quickly rotated, either manually, or preferably with a tool in the case where the end of the winding reel 29 is provided with a head (not shown). Moreover, it further allows to wind strap 15 in an aligned manner.

Figure 11:
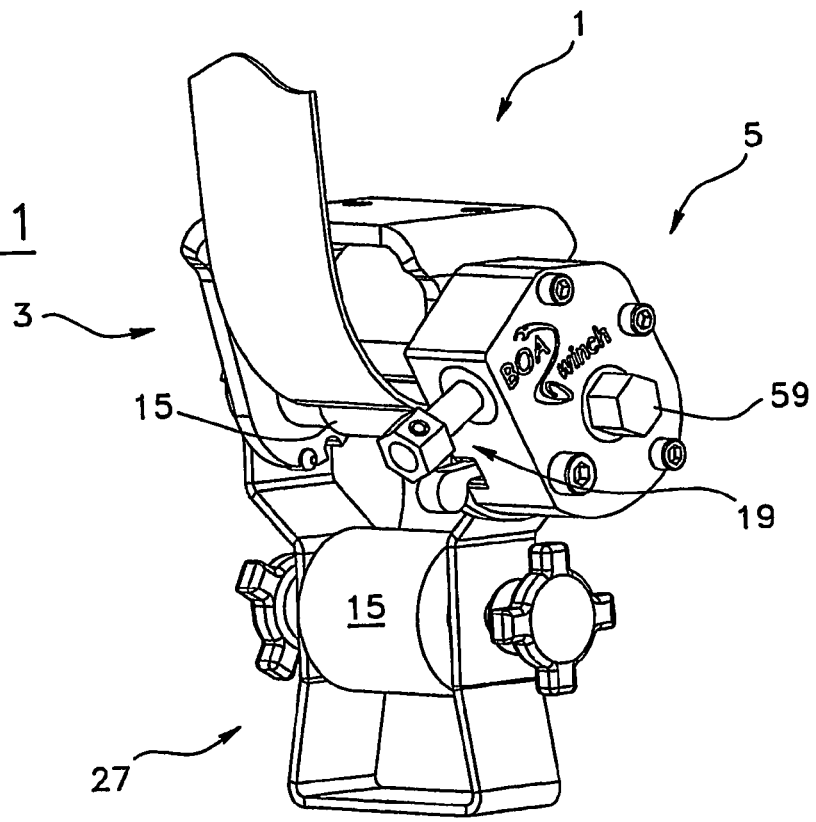
FIG. 11 is another perspective view of the winch of FIG. 10, the winch being shown now after the tightening reel has been rotated so as to clamp a segment of the strap between the clamping lamella and the tightening reel.
Figure 12:
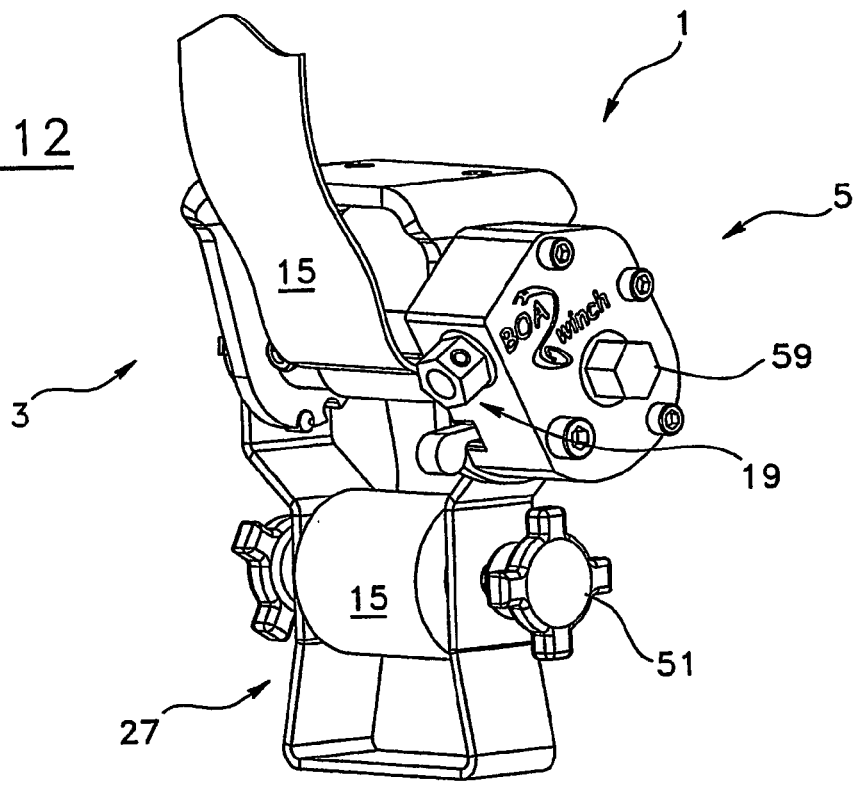
FIG. 12 is another perspective view of the winch of FIG. 11, the winch being shown now with the worm in the second configuration.
Figure 13:
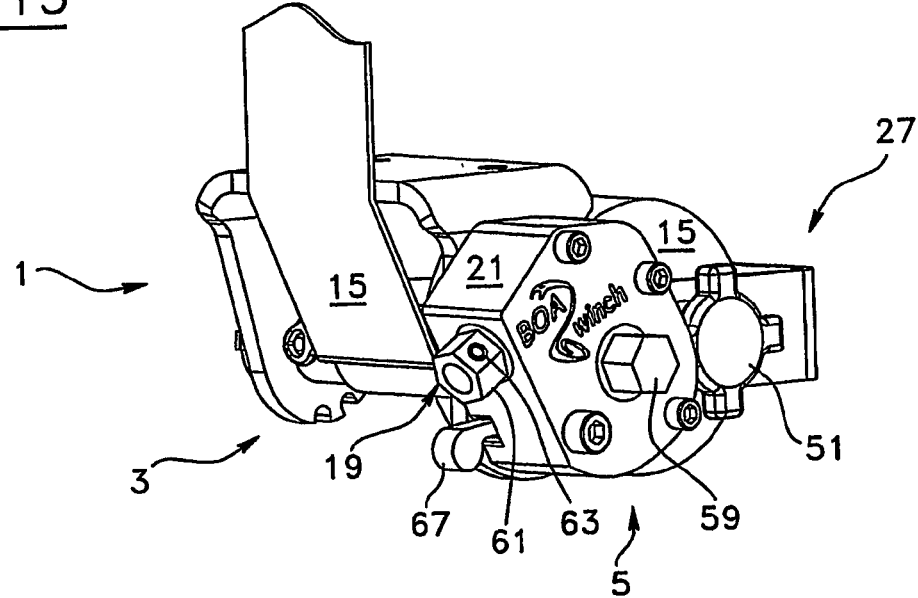
FIG. 13 is another perspective view of the winch of FIG. 12, the winch being shown now after the strap has being tighten onto the tightening reel by means of the worm, and with the winding assembly pulled back into a retracted horizontal position.

The belt is then fixed by means of its hook, or other suitable device, onto a corresponding anchoring point, whether it is by passing the strap 15 over the cargo to be secured and onto the opposite side of the trailer, or by attaching the strap 15 onto an end of a chain used to secure the cargo. The strap 15 is then tightened in place via the winch 1. FIG. 11 shows the winch 1 after the tightening reel 13 has been rotated so as to remove the slack on the strap 15 and clamp a segment of the strap 15 between the clamping lamella 53 and the tightening reel 13. After which, the worm 19 of the winch 1 is triggered into in the second configuration, preferably simply by pushing the worm 19 into the bore and rotating the worm 19 so as to threadedly engage the gear 17, and thus drive the gear 17 and in turn tightening reel 13, causing the strap 15 to tighten, as can be easily understood when referring to FIGS. 14 and 15. FIG. 13 illustrates the winch 1 after the strap 15 has being tighten onto the tightening reel 13 by means of the worm 19, and with the winding assembly 27 pulled back into a retracted horizontal position.

It is worth mentioning that, according to the present invention, some of the above-mentioned steps may be interchanged in order without affecting the proper operation of the winch 1, as apparent to a person skilled in the art, and without departing form the scope of the present invention. Indeed, for example, the winding of the excess portion of the strap 15 onto the winding reel 29 may be done before or after the tightening of the strap 15 onto the tightening reel 13.

Moreover, as can be easily understood from the aforementioned, since the portion of the strap 15 which is not used to secure the cargo is wound about the winding reel 29, only a few turns about the tightening reel 13, i.e. about two to four turns around the tightening reel 13 are required according to the present invention for properly securing the strap 15 and applying the necessary tension thereon. This method of tightening also allows to fix solidly the winch 1 to the side of the trailer when it is not being used to secure cargo on the vehicle, and thus prevents it from vibrating when the vehicle circulates.

The operation of the winch 1 according to the present invention is also advantageous in that the strap 15 may be loosened by means of the worm 19 simply by turning it some turns along a given direction, preferably counterclockwise.

Preferably, the strap 15 is tightened by means of the worm 19 simply by turning it via its head 61 some turns along a given direction, preferably in the clockwise direction. This method of tightening does not require a lot of force because the ratio of the worm 19 and the gear 17 according to the present invention is devised to be important and to multiply the force applied by the operator onto the crank. This method of tightening also allows to obtain a more uniform tightening on all the winches 1 because the fatigue and physical capabilities (i.e. strength) of the operator are no longer significant factors which influence the tightening of the straps 15.

Preferably, as aforementioned, about two to four turns of the strap 15 about the tightening reel 13 are sufficient. The winch 1 is fast and allows the belt to keep its tension because it winds on itself (i.e. the tightening reel 13, rather than on a large portion of wound strap portions). Indeed, the portion of the strap 15 which is not used for fastening the load is wound about a separate winding reel 29, and not the tightening reel 13.

Alternatively, it is possible to use a ratchet key with a conventional socket to make the tightening. The key is then inserted on the tightening head 59 of the tightening reel 13 and activated in the clockwise direction for example to tighten the strap 15.

As may now be appreciated, the present invention is a substantial improvement over other related winches known in the prior art in that, by virtue of its design and components, the winch 1 according to the present invention overcomes several of the prior art problems.

More particularly, in regards to tightening, the present winch 1 preferably uses a worm 19 which drives a gear 17. The worm 19 is preferably activated by means of a crank ratchet and the necessary effort is substantially reduced and practically nonexistent due to an important ratio of couple between the worm 19 and the gear 17. The advantages resulting therefrom are that the use of this type of system eliminates the risk of injuries to the operator of the winch 1; the tightening does not require a big physical effort by the operator; and the tightening is more uniform on all the winches 1 throughout the trailer. Alternatively, as aforementioned, it is also possible to use a ratchet key with a standard socket to make the tightening. Preferably, the key is inserted on the tightening head 59 of the tightening reel 13 and activated in the clockwise direction to tighten the load. Preferably also, the worm 19 is devised to be automatically triggered into corresponding first and second configurations when rotated along corresponding untightening and tightening directions of the strap 15. Preferably also, once the load is tightened, the tension in the strap 15 is maintained by the gear assembly 5, and the ratchet wheel 65 device is only provided alternatively, as a fail safe mechanism.

Concerning the tightening force, the winch 1 according to the present invention is advantageous in that, as can be easily understood from the aforementioned and the accompanying drawings, the tightening force which is achievable with the present winch 1 is more constant and uniform than what is possible with the winches of the prior art. Indeed, a bigger force of tightening may be achieved and there is less risk that the resulting secured load moves during the transportation.

Concerning the maintaining of the tightening tension in the fastening strap 15s, the present winch 1 according to the present invention is also advantageous in that the tension of tightening is maintained by the pressure exercised between the gear 17 and the worm 19. Advantages resulting therefrom are that the casing 21 stands by the tightening reel 13 and becomes independent from the frame of the winch 1. The winch 1 will thus less tend to deform during a reversal of the trailer for example.

Concerning the roll-up of the belt during the tightening, the winch 1 according to the present invention is also advantageous when compared to those of the prior art in that only about two to four turns of belt are preferably rolled-up on the tightening reel 13 to provide the belt with a suitable tension. The excess of the belt is rolled-up on the winding reel 29. Advantages resulting therefrom are that there is a greater tightening force because a reduced portion of the strap 15 presses onto itself; the tightening is more uniform on all of the winches 1; it allows the operator to avoid stopping the vehicle and retightening the belts during the transportation; and there is a decrease of the wear of the belts.

Concerning the roll-up of the belt when the winch 1 is not being used for securing cargo on the vehicle, it can be also be appreciated that the winch 1 according to the present invention is also advantageous when compared to those of the prior art. Indeed, only about two to four turns of the belt is rolled-up on the tightening reel 13 of the winch 1 in order to fix it securely. Moreover, the excess of the belt not used for securing is rolled-up on the winding up reel by means of a crank. Advantages resulting therefrom are the following: a fast procedure; a principle of tightening which allows to fix securely the winch 1 to the rail of the trailer; and the elimination of wear of rails due to vibrations which occur during circulation of the trailer.

Concerning the unrolling of a belt, the present winch 1 according to the present invention is also advantageous in that once the worm 19 is uncoupled (i.e. the first configuration), the operator has only to raise the clamping lamella 53 and unroll the belt. Indeed, the winch 1 according to the present invention allows the use of a single hand to unroll the belt.

The winch 1 according to the present invention is also advantageous in that it may be provided with an optional dynamometric socket. Indeed, according to the present invention, it is possible to use a crank or a key provided preferably with an hexagonal dynamometric socket such that it is possible to obtain exactly the same tension of tightening on all the winches 1, something that is not possible with conventional winches, as aforementioned.

The multifunction tie down winch 1 according to the present invention may be used on flatbed trailers, or may be used on other types of transportation vehicles, such as railway vehicles, maritime transportation, and the like.

The winch 1 according to the present invention is preferably devised so as to conform with the requirements of most security standards, in regards to the use of securement devices of suitable capacity, the required number thereof being established namely according to the load being transported and to the length of the load to be fastened.

Preferably, the components of the multifunction tie down winch 1 according to the present invention are made of suitable metallic materials, such as steel for example, or any other suitable materials, for properly sustaining the different loads to which the winch 1 may be suggested to, as apparent to a person skilled in the art.

As also apparent to a person skilled in the art, it is possible to make the winch 1 without the winding up reel. This way, the winch 1 will be more similar to a conventional winch but will still be provided with all the advantages of using the worm-gear assembly instead of a winding bar.

As also apparent to a person skilled in the art, it is possible to provide the winch 1 with a locking system for the winding up reel. Indeed, instead of using an indented wheel and a latch to lock the winding reel 29 once the load is tightened, it is possible to use two pivoting arms for example, fixed at the bottom of each internal side of the frame. These two arms will preferably serve as a support for the tightening reel 13, and the worm-gear assembly. During the tightening, the arms can rotate and move up due to the force applied, and lock the winding reel 29 at the end of their movement.

According to the present invention, the use of the winch 1 as a chain bender can be carried out by hooking the end hook of the strap 15 to the chain and by carrying out the same procedure of tightening, as above-discussed.

As may now be better appreciated, the fact of being able to place the winding assembly 27 in different positions with respect to the tightening assembly 3 enables to get around or avoid certain obstacles located under the trailer, such as chests, wheels, lights, and the like.

As may now be also better appreciated, the fact of being able of dismounting quickly the support of the winch 1 enables to remove the belt from the winch 1 and also to conform to this requirement where it applies. Certain operators remove the belts simply for protecting them against precipitations and/or theft.

As may now be appreciated, the present invention is a substantial improvement over the winches of the prior art in that, by virtue of its design and components, as briefly explained herein, the winch 1 according to the present invention a) eliminates the risk of accidents and serious injuries associated to the use of conventional winches; b) facilitates the return to the work of people having suffered from recent injuries (e.g. back or other body parts) since the physical requirements for operating the present winch 1 are fairly negligible; c) allows people with limited physical strength to reach more easily the market of the transportation by flatbed trailers, thus opening the door to woman drivers for example; d) allows to obtain a more powerful tightening of the loads without requiring much physical effort from the operator; e) allows to obtain a more uniform tightening on all the winches 1 of the trailer; f) allows to avoid having to frequently stop the vehicle and retighten the load several times during the transportation of the cargo; g) decreases the time required for the tightening of a load; h) eliminates the use of conventional chain benders; i) increases the road safety by decreasing the risk of slipping and shifting of a load during transportation; j) reduces the wear of the belts; k) reduces the operational costs in terms of time and material being used; l) will possibly allow the owners to benefit from reduction on insurance allowances or premiums paid to organisms involved in the management of transportation due to the decrease in the probability of injuries related to the use of the winches 1; and m) is preferably devised to meet with the requirements of security standards.

Of course, numerous modifications could be made to the above-described embodiments without departing from the scope of the invention as defined in the appended claims.

The invention claimed is:

1. A winch for use with a strap for fastening a load onto a transportation vehicle, the winch comprising:
   a tightening assembly, the tightening assembly comprising:
      a support structure having first and second support flanges and a cross member extending between the support flanges, the cross member being devised for mounting onto a corresponding side track of the vehicle; and
      a tightening reel for receiving a portion of the strap to be tightened about said reel, the tightening reel being pivotally mounted onto the first and second support flanges;
   a gear assembly operatively connected to the tightening assembly, the gear assembly comprising:
      a gear securely mounted about the tightening reel so as to rotate with said reel;
      a worm positioned adjacent to the gear and operable between a first configuration where the worm is away from the gear, and a second configuration where the worm is threadedly engaged with the gear so that a rotation of the worm drives the tightening reel via the gear; and
      a casing mounted onto the first support flange of the support structure and having corresponding recesses for containing the gear and worm respectively.

2. A winch according to claim 1, wherein the winch comprises:
   a winding assembly removably mountable onto the tightening assembly, the winding assembly comprising:
      a support structure having first and second extensions and a cross member extending between the extensions, the ends of the extensions being removably mountable onto the tightening assembly; and
      a winding reel for receiving an excess portion of the strap to be wound about the same, the winding reel being pivotally mounted onto the first and second extensions.

3. A winch according to claim 2, wherein the ends of the extensions of the winding assembly are removably mountable onto the tightening reel of the tightening assembly, and wherein the winding assembly is pivotably movable with respect to said tightening assembly, the winch further comprising adjustment means for selectively adjusting the positioning of the winding assembly with respect to the tightening assembly.

4. A winch according to claim 3, wherein the adjustment means comprise:
   a plurality of notches provided along a peripheral side portion of the second support flange of the tightening assembly; and
   a locking pin provided on the second extension of the support structure of the winding assembly for removably inserting into a corresponding notch of the peripheral side portion of the second support flange of the tightening assembly so as to lock the winding assembly into a corresponding position with respect to the tightening assembly.

5. A winch according to claim 1, wherein the tightening assembly comprises a clamping lamella removably mounted onto the tightening reel, the clamping lamella being provided with at least one leg mounted into the tightening reel and being movable thereabout, the clamping lamella being operable between a first configuration where it is positioned away from the tightening reel so as to enable a portion of the strap to be brought onto and removed from the tightening reel, and a second configuration where the clamping lamella is positioned with respect to the tightening reel so as to define a slit between the lamella and the tightening reel for receiving a segment of the strap thereinbetween, and where further rotation of the tightening reel, and further rotation of the strap about the clamping lamella, biases the clamping lamella towards the tightening reel for clamping the strap segment against the tightening reel.

6. A winch according to claim 2, wherein the ends of the first and second extensions of the winding assembly are provided with a hook and a hole respectively, the hook being shaped and sized for hooking the first extension onto the tightening reel, between the first and second support flanges of the support structure of the tightening assembly, adjacent to the first support flange, and the hole being shaped and sized for mounting the second extension onto an end of the tightening reel, adjacent to an outer face of the second support flange.

7. A winch according to claim 6, wherein the winch comprises an abutment pin provided on an inner face of the first support flange of the tightening assembly, said abutment pin cooperating with a curved portion of the hook of the first extension, the abutment pin being positioned on said inner face and the curved portion being shaped and sized so as to prevent the hook from being removed from the tightening reel along a predetermined range of rotation of the winding assembly with respect to the tightening assembly.

8. A winch according to claim 2, wherein the support structures of the tightening and winding assemblies are substantially U-shaped.

9. A winch according to claim 2, wherein the winch comprises with a rod mounted onto the winding reel so as to define a slit between the rod and the winding reel, said slit being shaped and sized for receiving an end portion of the strap.

10. A winch according to claim 1, wherein ends of the tightening reel and of the worm are provided with corresponding heads for receiving a socket of a corresponding cranking tool.

11. A winch according to claim 10, wherein the head of the worm is provided with a shear pin extending between said head and the end of the worm on which the head is mounted.

12. A winch according to claim 1, wherein one end of the winding reel is provided with a corresponding head for receiving a socket of a cranking tool, said corresponding head being securely mounted to the winding reel so as to rotate therewith.

13. A winch according to claim 1, wherein another end of the winding reel is provided with a knob being theadedly mountable onto said another end of the winding reel.

14. A winch according to claim 1, wherein the recess of the casing containing the worm is a bore, and wherein the worm is slidably movable within said bore so as to facilitate operation of the worm between its first and second configurations.

15. A winch according to claim 1, wherein the gear assembly comprises:
  a ratchet wheel securely mounted about the tightening reel so as to rotate with said reel, the ratchet wheel being provided with a plurality of peripheral teeth; and
  a pawl lever having an extremity positioned adjacent to the ratchet wheel and operable between a first configuration where the extremity of the pawl lever is away from the ratchet wheel, and a second configuration where the extremity of the pawl lever is inserted into a corresponding tooth of the ratchet wheel, thereby preventing the ratchet wheel and the tightening wheel from further rotating along a given direction.

16. A transportation vehicle comprising a winch according to claim 1.

17. A method of fastening a load with a strap onto a transportation vehicle according to claim 16, the method comprising the steps of:
  a) providing the transportation vehicle;
  b) mounting the winch onto a corresponding side track of the transportation vehicle;
  c) attaching a first extremity of the strap onto an anchoring point;
  d) clamping a portion of the strap about the tightening reel;
  e) rotating the tightening reel so as to tighten the strap.

18. A method according to claim 17, wherein step e) comprises the step of:
  f) operating the worm in its second configuration so as rotate the tightening reel via the gear.

19. A method according to claim 17, wherein the method comprises the steps of:
  g) mounting a winding assembly onto the tightening assembly of the winch, said winding assembly comprising:
    a support structure having first and second extensions and a cross member extending between the extensions, the ends of the extensions being removably mountable onto the tightening reel of the tightening assembly; and
    a winding reel for receiving an excess portion of the strap to be wound about the same, the winding reel being pivotally mounted onto the first and second extensions; and
  h) winding an excess portion of the strap onto the winding reel of the winding assembly.

* * * * *